United States Patent [19]
Kondo

[11] Patent Number: 6,119,018
[45] Date of Patent: *Sep. 12, 2000

[54] CDMA TYPE MOBILE COMMUNICATION SYSTEM CAPABLE OF REALIZING SOFT HANDOFF BETWEEN CELLS HAVING DIFFERENT CELL DIAMETERS

[75] Inventor: Seiji Kondo, Tokyo, Japan

[73] Assignee: NEC Corporation, Tokyo, Japan

[ * ] Notice: This patent is subject to a terminal disclaimer.

[21] Appl. No.: 08/870,619

[22] Filed: Jun. 6, 1997

[30]  Foreign Application Priority Data

Jun. 7, 1996 [JP] Japan .................................. 8-145820

[51] Int. Cl.⁷ ...................................................... H04B 1/38
[52] U.S. Cl. ........................... 455/522; 455/442; 370/332
[58] Field of Search ..................................... 455/522, 422, 455/432, 436, 442, 574, 38.3, 439, 343; 370/332, 320, 342, 335

[56]  References Cited

U.S. PATENT DOCUMENTS

| | | | |
|---|---|---|---|
| 4,613,990 | 9/1986 | Halpern ...................................... | 455/33 |
| 5,305,468 | 4/1994 | Bruckert et al. ......................... | 455/522 |
| 5,485,486 | 1/1996 | Gilhousen et al. ...................... | 455/522 |
| 5,574,983 | 11/1996 | Douzono et al. ........................ | 455/522 |
| 5,771,451 | 6/1998 | Takai et al. .............................. | 455/522 |
| 5,774,785 | 6/1998 | Karlsson .................................. | 455/522 |
| 5,794,129 | 8/1998 | Komatsu .................................. | 455/522 |
| 5,805,994 | 9/1998 | Perreault et al. ........................ | 455/522 |
| 5,839,056 | 11/1998 | Hakkinen ................................. | 455/522 |

FOREIGN PATENT DOCUMENTS 4-290098  10/1992  Japan .
5-252098  9/1993  Japan .
8-18503  1/1996  Japan .
9-312609  12/1997  Japan .

OTHER PUBLICATIONS

Telecommunication Industry Association/Electronic Industries Association/IS–95, PN–3421, pp. 6–194, 7–12–7–13.

*Primary Examiner*—Daniel S. Hunter
*Assistant Examiner*—Darnell R. Armstrong
*Attorney, Agent, or Firm*—Sughrue, Mion, Zinn, Macpeak & Seas, PLLC

[57]  ABSTRACT

Each radio base station (12-1, 12-2) receives an upward communication channel signal from a mobile station (13-2), calculates a transmission power control signal on the basis of the upward communication channel signal, and transmits the transmission power control signal. A host station (11A) receives the transmission power control signals from the radio base stations as received transmission power control signals, selects, as a selected transmission power control signal, one of the received transmission power control signals that makes upward transmission power for the mobile station the lowest power level, and transmits the selected transmission power control signal to a particular one of the radio base stations that communicates with the mobile station. The particular radio base station receives the selected transmission power control signal and transmits the selected transmission power control signal. The mobile station receives the selected transmission power control signal and controls the upward transmission power on the basis of the selected transmission power control signal.

6 Claims, 12 Drawing Sheets

CDMA TYPE MOBILE COMMUNICATION SYSTEM CAPABLE OF REALIZING SOFT HANDOFF BETWEEN CELLS HAVING DIFFERENT CELL DIAMETERS

BACKGROUND OF THE INVENTION

This invention relates to a mobile communication system and, in particular, to transmission power control of a upward communication channel on soft handoff peculiar to a CDMA (code division multiple access) type mobile communication system.

As is well known in the art, various multiple access types have been adopted in a mobile communication system. One of the multiple access types is a CDMA type. The CDMA type mobile communication system assigns to each channel with a particular code, transmits to the same repeater a modulated wave to which a carrier having the same carrier frequency is spectrum-spread with the code, establishes code synchronization in each receiving side, and identifies a desired channel. The CDMA type mobile communication system may be called a SSMA (spread spectrum multiple access) type mobile communication system.

The CDMA type mobile communication system comprises a plurality of terminals (mobile stations) and a plurality of radio base stations each of which serving as a repeater. Each radio base station is called a base transceiver station in the art. As described above, inasmuch as the plurality of terminals carry out communication using the carrier with the same carrier frequency, it is necessary for the CDMA type mobile communication system to uniformly receive energy of the upward communication channel from each terminal communicating with the radio base station without a position of the terminal.

In order uniformly receive energy in the radio base station, the CDMA type mobile communication system carries out transmission power control for the upward communication channel as described in TIA (Telecommunication Industry Association)/EIA (Electronic Industries Association)/IS-95.

It is assumed that a specific terminal carries out soft hand-off with radio base stations covering cells having different cell diameters. In addition, it is assumed that the specific terminal provides access to a particular radio base station covering the cell having a relatively larger cell diameter to depart from an area of soft hand-off. In this event, when an upward transmission power is controlled by a conventional transmission power control method, the specific terminal rapidly raises transmission power therefor. This is because the specific terminal communicates with the particular radio base station alone. In other words, the specific terminal can receive a downward communication channel signal from the particular radio base station alone. Under the circumstances, other radio base stations covering the cells each having a relatively small cell diameter receive larger interference energy from the specific terminal than those from other terminals communicating therewith. In other words, reception ratio Eb/N0 for each other terminal is less than a reference ratio Eb/N0. As a result, each of the other terminals raise their upward transmission power so that the reception ratio Eb/N0 is equal to the reference ratio Eb/N0. This means that interference energy in the cell having the relatively small cell diameter is further raised and it results in decreasing subscriber capacity held in the cell having the relatively small cell diameter. In addition, inasmuch as it is necessary for each other of the other terminals covering the cell having the relatively small cell diameter to raise its upward transmission power, it results in increasing consumed power in each other terminal and in shortening the life of its battery.

Various mobile communication systems related to the present invention are already known. By way of example, Japanese Unexamined Patent Publication of Tokkai No. Hei 5-252,098 or JP-A 5-252,098 discloses a mobile communication system which is capable of covering entirely a town and a premises with large traffic and a suburb and a thinly populated area with small traffic, using the frequency utilizing efficiently, and suppressing increase in the traffic due to hand-off. According to JP-A 5-252,098, the mobile communication system comprises a plurality of cells each of which has at least one radio base station in which mobile stations move in an area covered by the cells. The plurality of cells are made up of cells having various radii from a minimum cell to a maximum cell. In addition, each mobile station comprises means for varying its transmission power in accordance with the size of the cell. Specifically, each mobile station comprises a transmitter section which includes a variable amplifier for increasing and decreasing an amplitude of a signal in accordance with a control signal. However, JP-A 5-252,098 only discloses that each mobile station varies its transmission power in accordance with the size of the cell and is entirely different from a technical idea to vary an upward transmission power of each mobile station in accordance with reception energy in a radio base station from the mobile station (in other words, in accordance with a distance between the radio base station and the mobile station). In addition, JP-A 5-252,098 does not concretely explain how to generate the control signal supplied to the variable amplifier in the transmitter section of the mobile station.

Another example is disclosed in U.S. Pat. No. 4,613,990 issued to Samuel W. Halpern. According to Halpern, power levels in first and second stations in a cellular radiotelephone system are dynamically adjusted from only one of them. The second station receives signals from the first and, on the basis of the level of those signals, first adjusts its own transmitter power level to be within a predetermined range and then directs the adjustment of the power level of the first station to be within a predetermined range. Parameters used in processing call handoffs are also adjusted to correspond to the power level adjustments to prevent false handoffs due to the power level changes. However, Halpern does not perceive the above-mentioned problems in a case where a mobile station departs from an area of soft hand-off and therefore does not provide means for solving the above-mentioned problems.

Japanese Unexamined Patent Publication of Tokkai No. Hei 4-290,098 or JP-A 4-290,098 discloses a mobile communication system which is capable of performing mobile switching without interrupting speech even when the service area of a base station is changed while the speech is being performed in the mobile communication system for broad band cordless telephone in building connected to an exchange and city area. According to JP-A 4-290,098, the above-mentioned purpose can be attained by learning a cell boundary line where electric field strength between base stations are set equal by a central station in advance, and calculating the position and the travel speed of mobile machines by measuring the electric field strength of the mobile machines. In such a way, (a) the arithmetic rule of the mobile machine can be simplified even in the building in which cell shape is complicated, and (b) urgency can be decided by calculating a time when the mobile machine arrives at the boundary line, which reduces arithmetic processing quantity, and also, (c) it is possible to realize soft mobile switching for the switching of the base station with a simple arithmetic rule and to improve speech quality. However, JP-A 4-290,098 only discloses technique to perform mobile switching without interrupting speech even when the mobile machine changes the service area of the base station during telephone conversation and is entirely different from a technical idea to control an upward transmission power of each mobile machine.

SUMMARY OF THE INVENTION

It is therefore an object of this invention to provide a CDMA type mobile communication system which is capable of realizing soft hand-off among cells having different cell diameters although it is necessary to change a cell diameter of each cell due to traffic density.

It is another object of this invention to provide a mobile communication system which is capable of inhibiting subscriber capacity held in a cell from decreasing.

It is still another object of this invention to provide a mobile communication system of the type described, which is capable of decreasing consumed power in each terminal by lowering its upward transmission power.

It is yet another object of this invention to provide a mobile communication system of the type described, which is capable of lengthening the life of battery in each terminal.

Other objects of this invention will become clear as the description proceeds.

According to an embodiment of the invention a mobile communication system comprises a plurality of radio base stations covering respective service areas, at least one mobile station moving in the service areas to carry out radio communication between the mobile station and the radio base stations, and a host station connected to the radio base stations. According to this invention, each of the radio base stations comprises means for receiving an upward communication channel signal from the mobile station, means for calculating, on the basis of the upward communication channel signal, a transmission power control signal for controlling transmission power for the mobile station, and means for transmitting the transmission power control signal to the host station. The host station comprises means for receiving the transmission power control signals from the radio base stations as received transmission power control signals, means for selecting, as a selected transmission power control signal, one of the received transmission power control signals that makes the transmission power for the mobile station the lowest power level, and means for transmitting the selected transmission power control signal to a particular one of the radio base stations that communicates with the mobile station. Each of the radio base stations comprises means for receiving the selected transmission power control signal from the host station and means for transmitting the selected transmission power control signal to the mobile station. The mobile station comprises means for receiving the selected transmission power control signal from the radio base station communicating with the mobile station and means for controlling the transmission power on the basis of the selected transmission power control signal.

According to another aspect of this invention, a mobile communication system comprises a plurality of radio base stations covering respective service areas and at least one mobile station moving in the service areas to carry out radio communication between the mobile station and the radio base stations. According to this invention, each of the radio base stations comprises means for receiving an upward communication channel signal from the mobile station, means for calculating, on the basis of the upward communication channel signal, a transmission power control signal for controlling transmission power for the mobile station, means for transmitting the transmission power control signal to the radio base stations, means for receiving the transmission power control signals from the radio base stations as received transmission power control signals, means for selecting, as a selected transmission power control signal, one of the received transmission power control signals that makes the transmission power for the mobile station the lowest power level, and means for transmitting the selected transmission power control signal to the mobile station. The mobile station comprises means for receiving the selected transmission power control signal from the radio base station communicating therewith and means for controlling the transmission power therefor on the basis of the selected transmission power control signal.

According to yet another aspect of this invention, a method of controlling transmission power for a mobile station for use in a mobile communication system comprising a plurality of radio base stations covering respective service areas and a host station connected to the radio base stations. The mobile station moves in the service areas to carry out radio communication between the mobile station and the radio base stations. According to this invention, the above-understood method comprises the steps of: receiving, in each of the radio base stations, an upward communication channel signal from the mobile station; calculating, in each of the radio base stations, a transmission power control signal for controlling the transmission power of the mobile station on the basis of the upward communication channel signal; transmitting the transmission power control signal from each of the radio base stations to the host station; receiving, in the host station, the transmission power control signals from the radio base stations as received transmission power control signals; selecting, in the host station, as a selected transmission power control signal, one of the received transmission power control signals that makes the transmission power for the mobile station the lowest power level; transmitting, from the host station, the selected transmission power control signal to a particular one of the radio base stations that communicates with the mobile station; receiving, in the particular one of the radio base stations, the selected transmission power control signal from the host station; transmitting, from the particular one of the radio base stations, the selected transmission power control signal to the mobile station; receiving, in the mobile station, the selected transmission power control signal from the particular one of the radio base stations; and controlling, in the mobile station, the transmission power on the basis of the selected transmission power control signal.

According to another aspect of this invention, a method of controlling transmission power for a mobile station for use in a mobile communication system comprising a plurality of radio base stations covering respective service areas is described. The mobile station moves in the service areas to carry out radio communication between the mobile station and the radio base stations. According to this invention, the afore-mentioned method comprises the steps of: receiving, each of the radio base stations, an upward communication channel signal from the mobile station; calculating, each of the radio base stations, a transmission power control signal for controlling the transmission power for the mobile station on the basis of the upward communication channel signal; transmitting the transmission power control signal from each of the radio base stations to the radio base stations;

receiving, in each of radio base stations, the transmission power control signals from the radio base stations as received transmission power control signals; selecting, in each of radio base stations, as a selected transmission power control signal, one of the received transmission power control signals that makes the transmission power of the mobile station the lowest power level; transmitting the selected transmission power control signal from each of the radio base stations to the mobile station; receiving, in the mobile station, the selected transmission power control signal from the radio base station communicating therewith; and controlling, in the mobile station, the transmission power on the basis of the selected transmission power control signal.

On describing the gist of a further aspect of this invention, it is possible to understand that a radio base station carries out radio communication with a mobile station in a mobile communication system. The radio base station is connected to a host station in the mobile communication system. According to this invention, the above-mentioned radio base station comprises means for receiving an upward communication channel signal from the mobile station, means for calculating, on the basis of the upward communication channel signal, a transmission power control signal for controlling transmission power for the mobile station, means for transmitting the transmission power control signal to the host station, means for receiving a selected transmission power control signal from the host station, and means for transmitting the selected transmission power control signal to the mobile station.

According to a further aspect of this invention, a host station for use in a mobile communication system comprises a plurality of radio base stations each described above. According to this invention, the abovementioned host station comprises means for receiving the transmission power control signals from the radio base stations as received transmission power control signals, means for selecting, as the selected transmission power control signal, one of the received transmission power control signals that makes the transmission power for the mobile station the lowest power level, and means for transmitting the selected transmission power control signal to a particular one of the radio base stations that communicates with the mobile station.

According to a yet a further aspect of this invention, a radio base station carries out radio communication with a mobile station in a mobile communication system. The radio base station is one of a plurality of radio base stations in the mobile communication system. According to this invention, the above-mentioned radio base station comprises means for receiving an upward communication channel signal from the mobile station, means for calculating, on the basis of the upward communication channel signal, a transmission power control signal for controlling transmission power for the mobile station, means for transmitting the transmission power control signal to the radio base stations, means for receiving the transmission power control signals from the radio base stations as received transmission power control signals, means for selecting, as a selected transmission power control signal, one of the received transmission power control signals that makes the transmission power for the mobile station the lowest power level, and means for transmitting the selected transmission power control signal to the mobile station.

DESCRIPTION OF THE PREFERRED EMBODIMENTS

Figure 1:
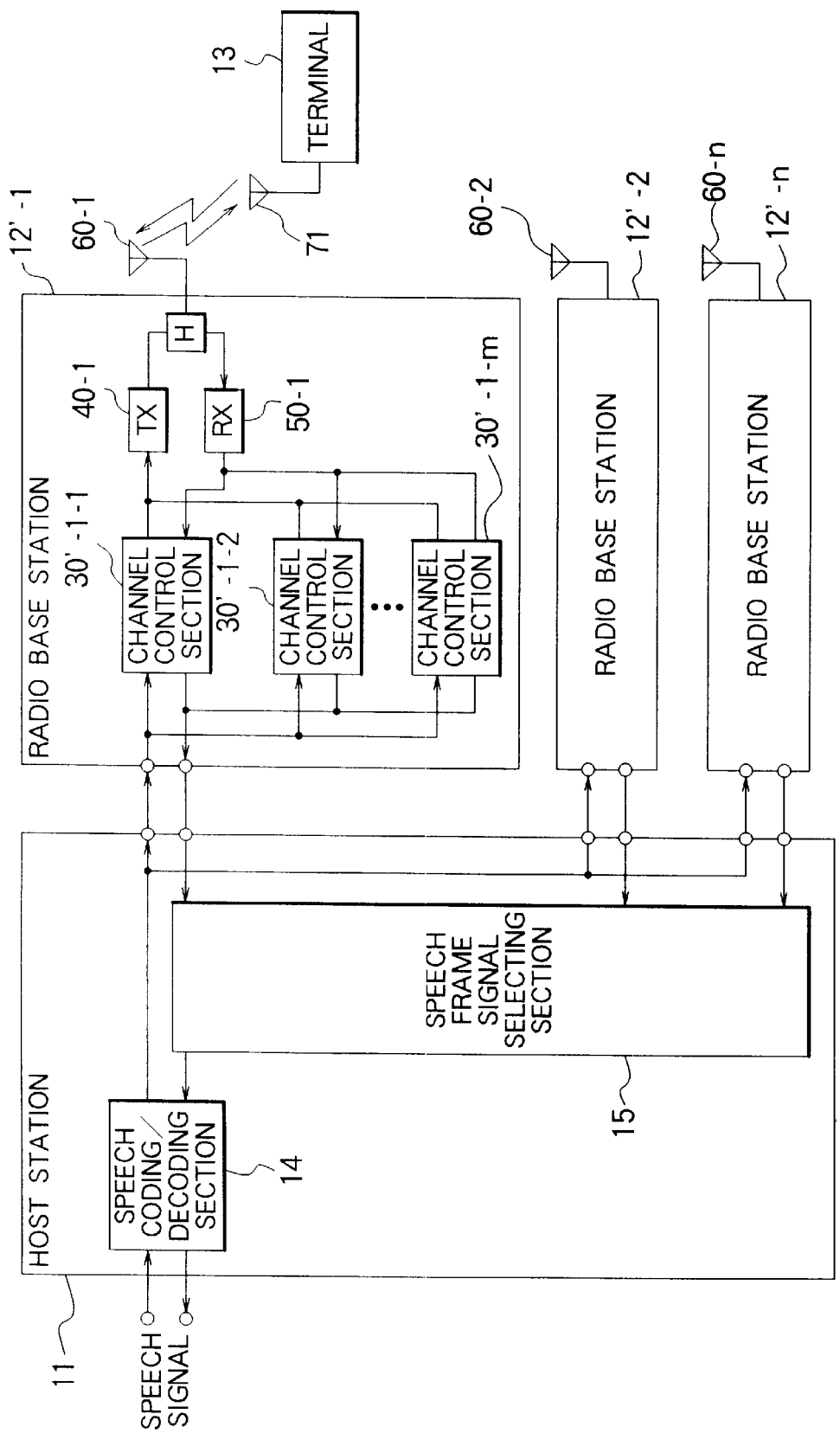
FIG. 1 is a block diagram of a conventional CDMA type mobile communication system.

Referring to FIG. 1, a conventional CDMA type mobile communication system will be described in order to facilitate an understanding of the present invention. The illustrated CDMA type mobile communication system comprises a host station 11, first through n-th radio base stations 12'-1, 12'-2, . . . , and 12'-n, and a plurality of terminals or mobile stations (only one terminal (or mobile station) 13 is illustrated in the drawing), where n represents an integer which is not less than two. The host station 11 is called a base station controller in the art while the radio base station is called a base transceiver station in the art.

The host station 11 comprises a host station speech coding/decoding section 14 and a speech frame signal selecting section 15. The host station 11 is connected to the first through the n-th radio base stations 12'-1 to 12'-n. The first base station 12'-1 comprises m first channel control sections 30'-1-1, 30'-1-2, . . . , and 30'-1-2, a first base station transmitter (TX) 40-1, a first base station receiver (RX) 50-1, and a first base station antenna 60-1, where m represents an integer which is not less than two. Although illustration is omitted, the second through the n-th radio base stations 12'-2 to 12'-n are similar in structure to the first radio base station 12'-1. A second and an n-th channel antennas 60-1 and 60-n alone are illustrated. The first through the n-th radio base stations 12'-1 to 12'-n cover first through n-th service areas (not shown), respectively. The terminal 13 moves in the first through the n-th service areas to communicate with the first through the n-th radio base stations 12'-1 to 12'-n.

The following is a description of the operation of the CDMA type mobile communication system illustrated in FIG. 1.

Figure 2:
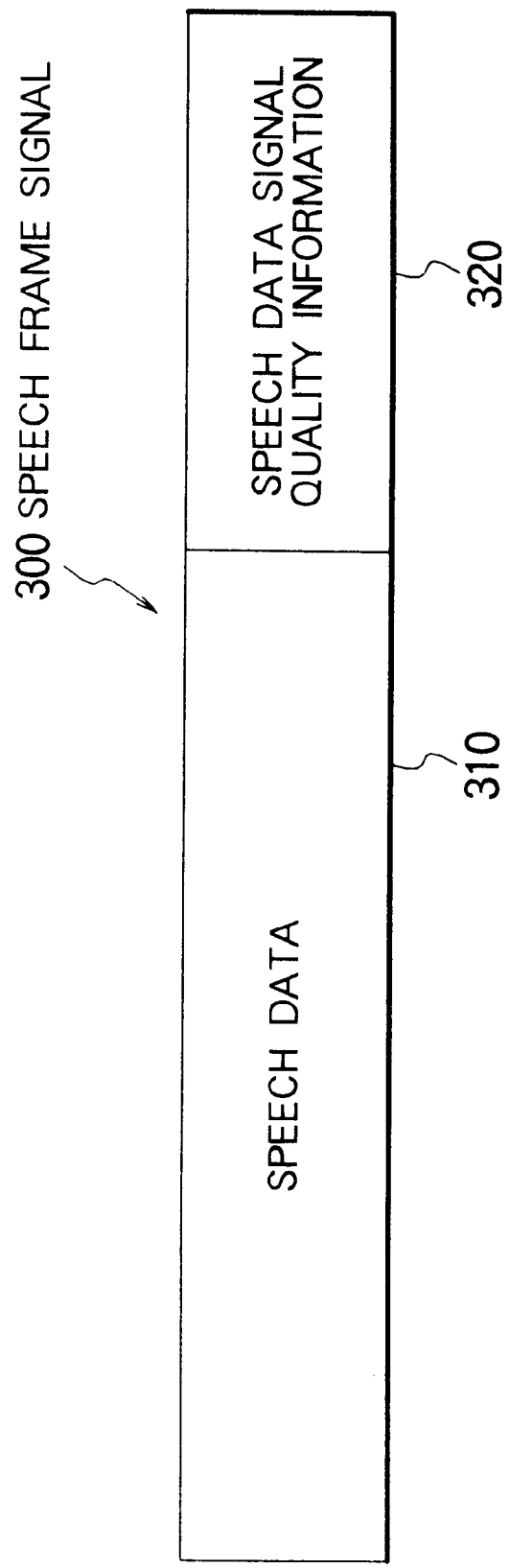
FIG. 2 shows a format of a speech frame signal for use in the CDMA type mobile communication system illustrated in FIG. 1.

Transmitted from the terminal 13 to the host station 11 through the first radio base station 12'-1, an upward communication channel signal is sent via the first antenna 60-1 to the first base station receiver 50-1 to be demodulated. Demodulated by the first base station receiver 50-1, a demodulated signal is decoded by either one of the m first channel control sections, for example, the first channel control section 30'-1-1 to obtain a first base station output speech frame signal 300 as illustrated in FIG. 2. The speech frame signal 300 comprises speech data 310 and speech data signal quality information 320 as shown in FIG. 2. Produced by the first radio base station 12'-1, the first base station output speech frame signal 300 is sent to the host station 11 as a first host input speech frame signal via a communication line connecting the first base station 12'-1 with the host station 11.

Sent to the host station 11, the first host input speech frame signal 300 is supplied via the speech frame signal selecting section 15 to the host station speech coding/decoding section 14 to be converted to a host output speech signal. The speech frame signal selecting section 15 selects, as a selected speech frame signal, one of the host input speech frame signals 300 sent from the first through the n-th radio base stations 12'-1 to 12'-n that has the best signal quality on the basis of the speech data signal quality information 320. The speech frame signal selecting section 15 sends the selected speech frame signal to the host speech coding/decoding section 14. The host input speech frame signals 300 are sent to the speech frame signal selecting section 15 from at least two of the first through the n-th radio base stations 12'-1 to 12'-n on soft hand-off where the terminal 13 communicates therewith.

In the CDMA type mobile communication system of the CDMA system where a plurality of terminals communicate using a carrier having the same carrier frequency, the soft hand-off is not the only means for decreasing upward interference by inhibiting transmission power in an upward communication channel from the terminal which lies of the boundary of the service area of each radio base station but means for decreasing downward interference by inhibiting transmission power in downward communication channels from the radio base stations can also be used.

Attention is directed to a signal sent from the host station 11 to the terminal 13 via the first radio base station 12'-1. At first, a host input speech signal is converted by the host station speech coding/decoding section 14 into a host output speech frame signal. The host output speech signal is sent, as a first base station input speech frame signal, to the first channel control section 30'-1-1 of the first radio base station 12'-1 connected to the host station 11. The first base station input speech frame signal is coded by the first channel control section 30'-1-1, modulated by the first base station transmitter 40-1, and transmitted, as a first downward communication channel signal, to the terminal 13 from the first base station antenna 60-1 using a downward communication channel.

Figure 3:
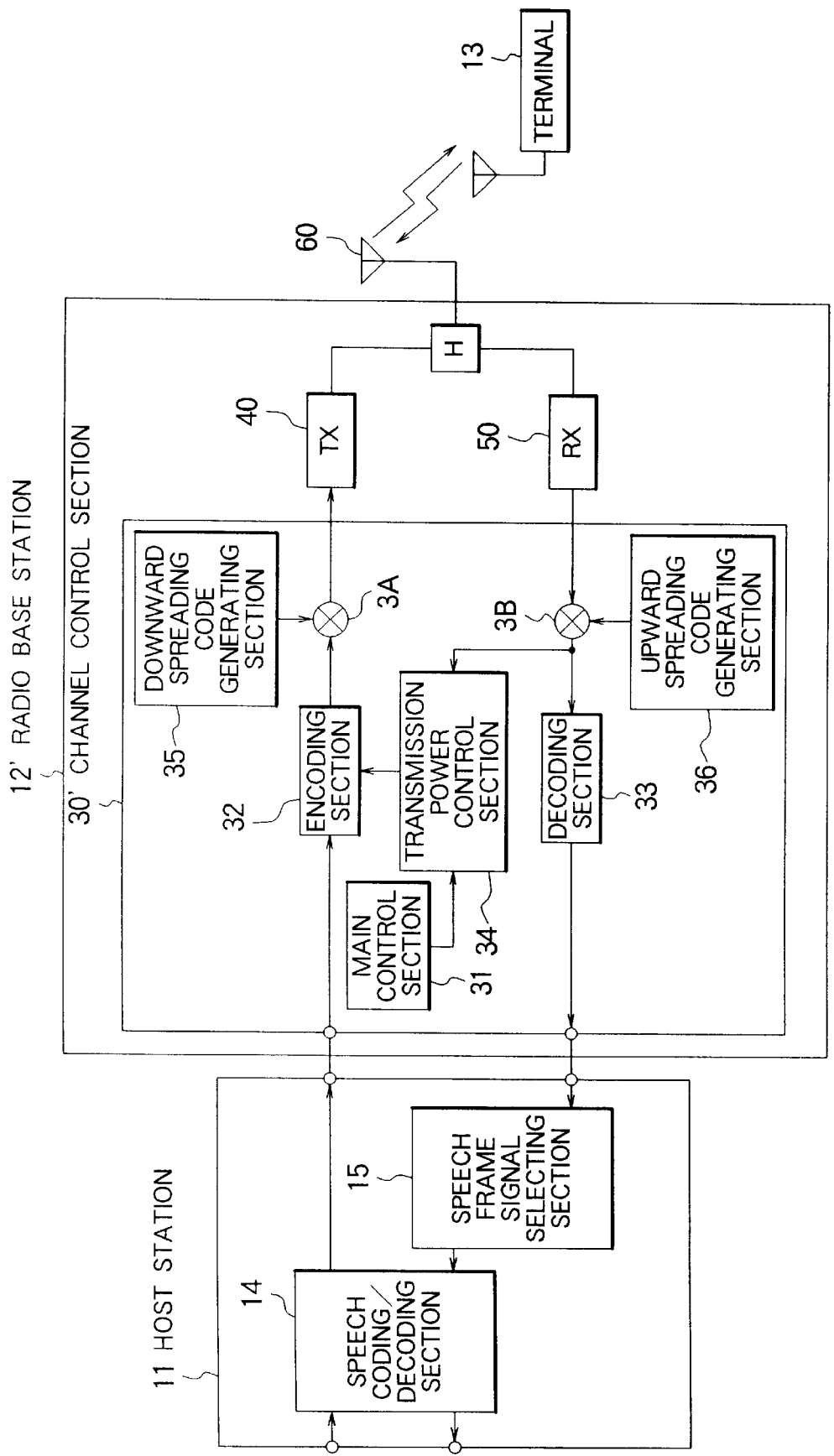
FIG. 3 is a block diagram of a radio base station for use in the CDMA type mobile communication system illustrated in FIG. 1.
Figure 4:
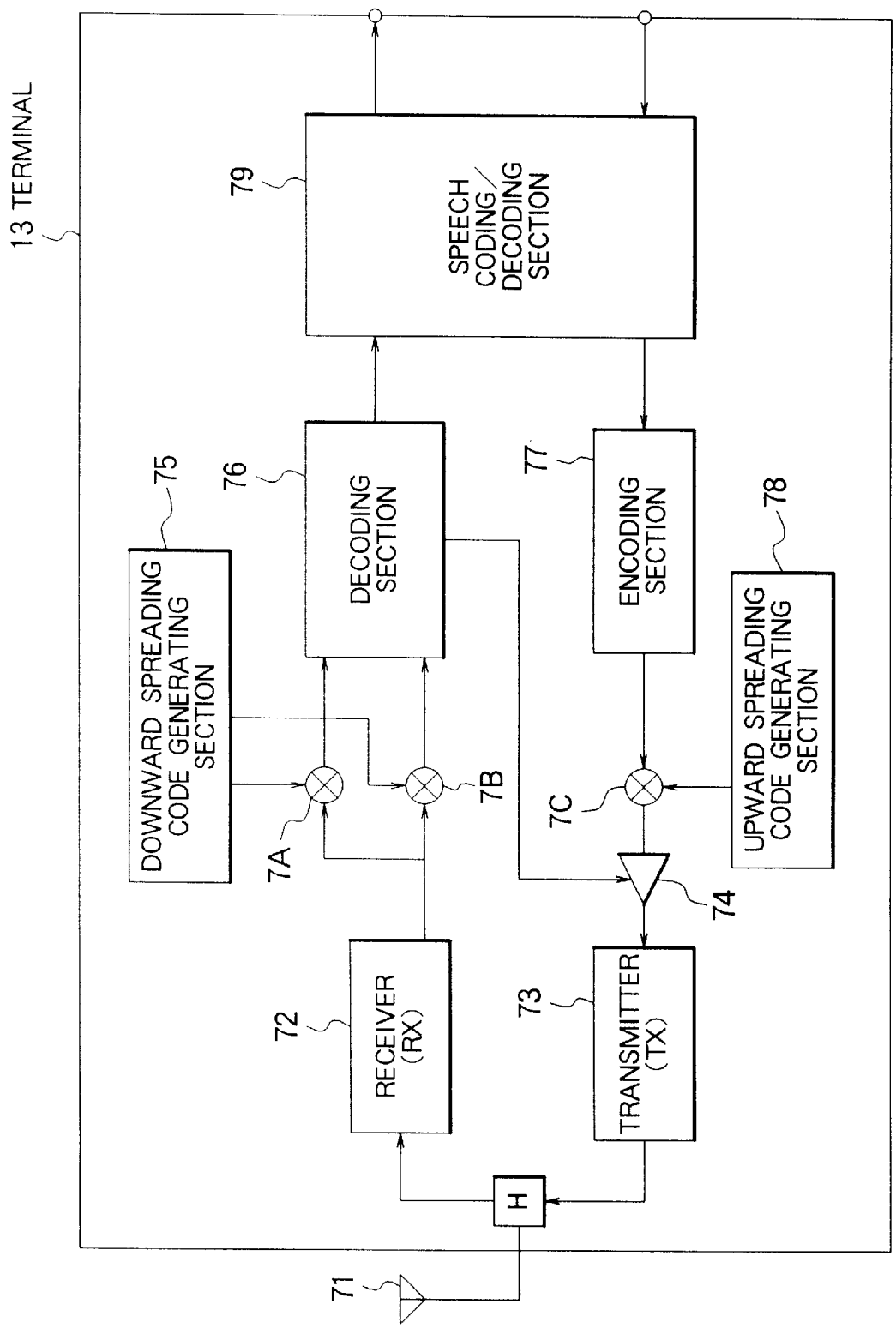
FIG. 4 is a block diagram of a terminal (mobile station) for use in the CDMA type mobile communication system illustrated in FIG. 1.

Referring to FIGS. 3 and 4, an upward transmission power control in an upward communication channel. FIG. 3 is a block diagram of the first radio base station 12'-1 with only the channel control section 30'-1-1 for use in communicating with the terminal 13 picked up among the m first channel control sections 30'-1-1 to 30'-1-m in order to describe a method of an e upward transmission power control of the upward communication channel in detail. FIG. 4 is a block diagram of the terminal 13.

As shown in FIG. 3, the channel control section 30 (suffix omitted) of the radio base station 12' (suffix omitted) comprises a channel main control section 31, a channel encoding section 32, a channel decoding section 33, a transmission power control section 34, a channel downward spreading code generating section 35, a channel upward spreading code generating section 36, a channel output multiplier 3A, and a channel input multiplier 3B.

As shown in FIG. 4, the terminal 13 comprises a terminal antenna 71, a terminal receiver 72, a terminal transmitter 73, an output gain control section 74, a terminal downward spreading code generating section 75, a terminal decoding section 76, a terminal encoding section 77, a terminal upward spreading code generating section 78, a terminal speech coding/decoding section 79, and first through third multipliers 7A, 7B, and 7C.

Referring to FIG. 3, the radio base station 12' receives an upward communication channel signal from the terminal 13 by the base station antenna 60 (suffix omitted), and the upward communication channel signal is demodulated by the base station receiver 50 (suffix omitted) into a base station demodulated signal. Supplied from the base station receiver 50, the base station demodulated signal is correlation demodulated using a terminal intrinsic spreading code by the channel input multiplier 3B into a base station correlation demodulated signal and then the base station correlation demodulated signal is supplied to the transmission power control section 34 and the channel decoding section 33. The terminal intrinsic spreading code is set in the channel upward spreading code generating section 36 of the channel control section 30' in the radio base station 12' communicating with the terminal 13 at the same time that the host station 11 assigns a communication channel to the terminal 13. The transmission power control section 34 measures a reception ratio Eb/N0 in the base station correlation demodulated signal that is a ratio of reception energy to interference energy per bit in the upward communication channel from the terminal 13. Subsequently, the transmission power control section 34 compares the measured reception ratio Eb/N0 with a reference ratio Eb/N0 set by the channel main control section 31 to produce a transmission power control signal for controlling the upward transmission power of the terminal 13.

Specifically, when the reception ratio Eb/N0 is greater than the reference ratio Eb/N0, the transmission power control section 34 produces the transmission power control signal indicative of lowering the upward transmission power. This is because the terminal 13 transmits the upward communication channel signal using an excess of transmission power. Conversely, if the reception ratio Eb/N0 is less than the reference ratio Eb/N0, the transmission power control section 34 produces the transmission power control signal indicative of raising the upward transmission power. This is because the terminal 13 transmits the upward communication channel signal at insufficient transmission power.

Set by the channel main control section 31, the reference ratio Eb/N0 has the same value in all of the channel control sections 30' so as to maintain the same communication quality in all of the terminals. Produced by the transmission power control section 34, the transmission power control signal is supplied to the channel encoding section 32.

The channel coding section 32 encodes a base station input speech frame signal 300 sent from the host station 11 into a base station encoded signal and then superimposes the transmission power control signal on the base station encoded signal. An output signal from the channel coding section 32 is spread by a base station intrinsic spreading code into a base station spread signal which is supplied to the base station transmitter 40. The base station transmitter 40 modulates a carrier with the base station spread signal to produce a base station modulated signal which is transmitted to the terminal 13 via the base station antenna 60 as a downward communication channel signal using a downward communication channel. The base station intrinsic spreading code has a different value for each radio base station so that the terminal 13 differentiates the radio base stations 12'. The base station intrinsic spreading code is generated by the channel downward spreading code generating section 35.

Referring to FIG. 4, transmitted from the radio base station 12', the downward communication channel signal is supplied to the terminal receiver 72 via the terminal antenna 71 and is demodulated by the terminal receiver 72 into a terminal demodulated signal. The terminal demodulated signal from the terminal receiver 72 is correlation demodulated using the base station intrinsic spreading code produced by the terminal downward spreading code generating section 75 into a terminal correlation demodulated signal. The base station intrinsic spreading code to be set in the terminal downward spreading code generating section 75 is delivered from the host station 11 each time the host station 11 assigns the communication channel to the terminal 13. On soft hand-off where the terminal 13 simultaneously communicates with two different radio base stations, two different base station intrinsic spreading codes are assinged to the terminal 13 by the host station 11 and then the two different base station intrinsic spreading codes are produced by the terminal downward spreading code generating section 75.

The terminal correlation demodulated signal is separated into a terminal reception speech frame signal 300 and the transmission power control signal by the terminal decoding section 76. The terminal reception speech frame signal 300 is sent to the terminal speech coding/decoding section 79 while the transmission power control signal is sent to the output gain control section 74. Sent to the terminal speech coding/decoding section 79, the terminal reception speech frame signal 300 is converted into a terminal output speech signal by the terminal speech coding/decoding section 79.

Attention is directed to a signal transmitted from the terminal 13 to the radio base station 12'. A terminal input speech signal is converted by the terminal coding/decoding section 79 into a terminal transmission speech frame signal which is encoded by the terminal coding section 77 into a terminal encoded signal. The terminal encoded signal is spread by the third multiplier 7C using the terminal intrinsic spreading code produced by the terminal upward spreading code generating section 78 into a terminal spread signal. A power level of the terminal spread signal is controlled by the output gain control section 74 using the transmission power control signal into a power controlled signal and then the power controlled signal is sent to the terminal transmitter 73.

The terminal transmitter 73 modulates a carrier with the power controlled signal to produce a terminal modulated signal which is transmitted to the radio base station 12' from the terminal antenna 71 as the upward communication channel signal.

As described above, the radio base station generates the transmission power control signal for the terminal on the basis of the reception energy in the upward communication channel signal transmitted from the terminal to the radio base station and transmits the transmission power control signal using the downward communication channel signal. The terminal receives the transmission power control signal and controls the upward transmission power for the upward communication channel on the basis of the transmission power control signal. Therefore it is possible to maintain a signal quality of the communication channel by keeping the reception ratio Eb/N0 to the reference ratio Eb/N0.

Figure 5:
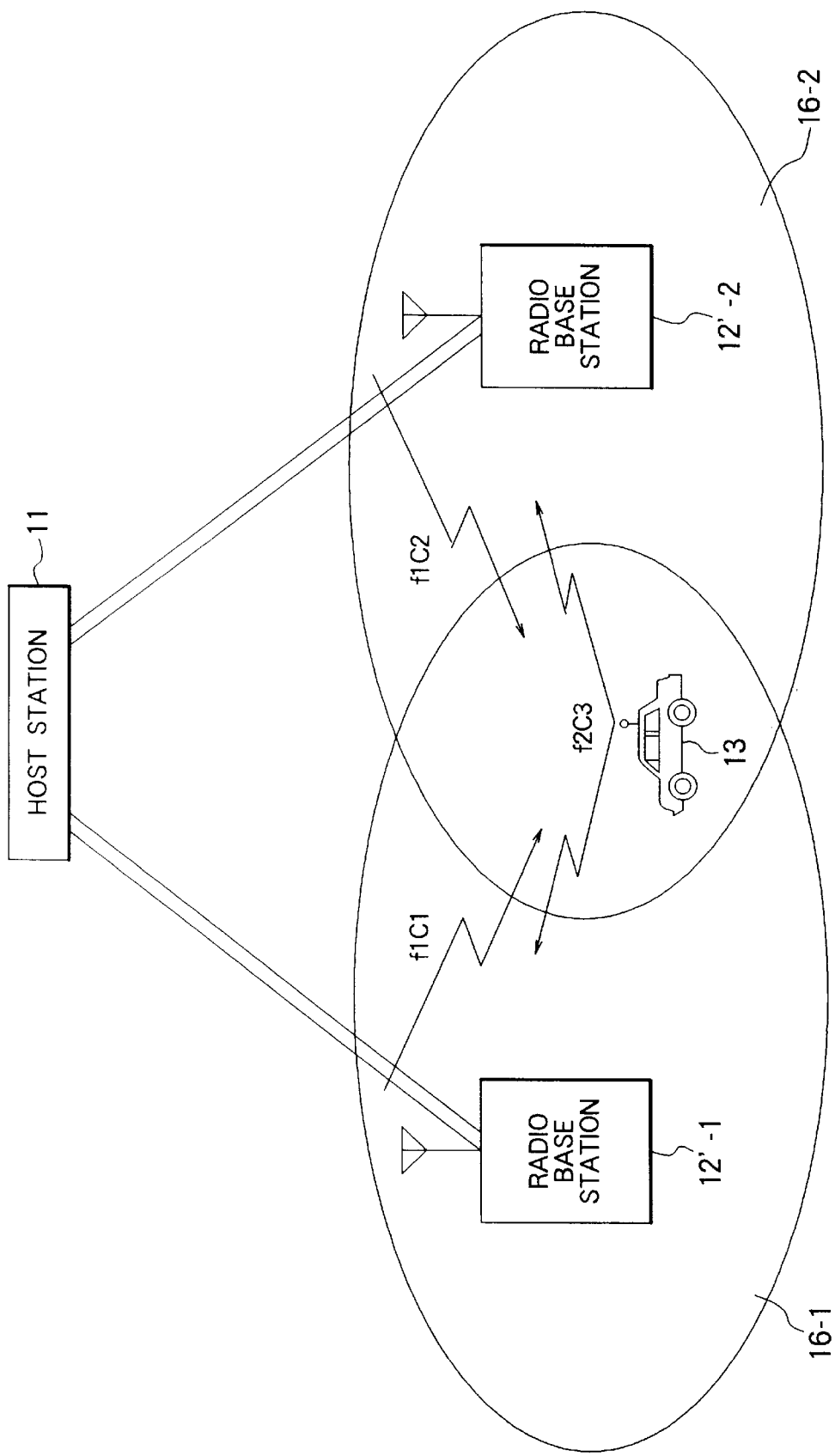
FIG. 5 shows a connection state in the CDMA type mobile communication system illustrated in FIG. 1 on soft hand-off.

Referring to FIG. 5 in addition to FIGS. 3 and 4, description is made as regards the upward transmission power control on the soft hand-off that is peculiar to a CDMA type mobile communication system. As described above, the CDMA type mobile communication system can carry out the soft hand-off where a terminal simultaneously communicates with two or more different radio base stations. This is because all radio base stations communicate using the carrier having the same carrier frequency.

FIG. 5 is a view showing a connection state in the CDMA type mobile communication system on the soft hand-off. It will be assumed as follows. One skilled in the art will appreciate the following is an exemplary description and that other configurations are possible. The first radio base station 12'-1 covers a first service area or cell 16-1 while the second radio base station 12'-2 covers a second service area or cell 16-2. In addition, the terminal 13 lies in an area which is overlapped in the first and the second service areas 16-1 and 16-2. Under the circumstances, the terminal 13 can simultaneously communicate with the first and the second radio base stations 12'-1 and 12'-2. This is the soft hand-off. Herein, the service area is a receivable area where the terminal can receive the downward communication channel signal from the radio base station disposed therein. It is noted that the radio base station can receive not only an upward communication channel signal from a terminal which lies within the service area converted thereby but also another upward communication channel signal from another terminal which is apart from the service area in question but is lies close to the service area in question.

It will be also presumed as follows that downward communication channel is assigned with a first carrier frequency f1 while the upward communication channel is assigned with a second carrier frequency f2. The first and the second radio base stations 12'-1 and 12'-2 have first and second base station intrinsic spreading codes C1 and C2 while the terminal 13 has the terminal intrinsic spreading code depicted at C3.

In this event, transmitted from the terminal 13 to the first and the second radio base stations 12'-1 and 12'-2, the upward communication channel signal is transmitted using the second carrier frequency f2 with the upward communication channel signal spread by the terminal intrinsic spreading code C3. Each of the first through the second radio base stations 12'-1 and 12'-2 receives the upward communication channel signal from the terminal 13 using the terminal intrinsic spreading code C3 set by the host station 11. After receiving, in the manner which is described in conjunction with FIG. 3, the first and the second radio base stations 12'-1 and 12'-2 generate first and second transmission power control signals by comparing the reception ratio Eb/N0 with the reference ratio Eb/N0. The first and the second radio base stations 12'-1 and 12'-2 superimpose the first and the second transmission power control signals on first and second downward communication channel signals, respectively. The first and the second radio base stations 12'-1 and 12'-2 transmit, as first and second downward communication channel signals, first and second superimposed signals using the first carrier frequency F1 with the first and the second superimposed signals spread by the first and the second base station intrinsic spreading codes C1 and C2, respectively. Inasmuch as the first carrier frequency F1 for the downward communication channel is used all of the radio base stations, the terminal 13 can differentiate the first and the second radio base stations 12'-1 and 12'-2 by spreading the first and the second downward communication channel signals using the first and the second base station intrinsic spreading codes C1 and C2 for the first and the second radio base stations 12'-1 and 12'-2.

During the soft hand-off, the terminal 13 receives the first and the second downward communication channel signals from the first and the second radio base stations 12'-1 and 12'-2 using the first and the second base station intrinsic spreading codes C1 and C2. If the first and the second transmission power control signals coincide with each other, the terminal 13 controls the upward transmission power in accordance with one of the first and the second transmission power control signals. If the first and the second transmission power control signals differ from each other, the terminal 13 controls the upward transmission power so as to make the lowest power level. That the first and the second transmission power control signals differ from each other means that the reception ratio Eb/N0 of the upward communication channel in one radio base station is higher than that in another radio base station. Under the circumstances, the terminal 13 can maintain quality of the upward communication channel from the terminal 13 if the upward transmission power is controlled in accordance with the transmission power control signal supplied from the radio base station having a higher reception ratio Eb/N0. That the first and the second transmission power control signals differ from each other occurs in a case where the terminal 13 during the soft hand-off approaches either of the radio base stations 12'-1 and 12'-2.

It will now be assumed that the terminal 13 approaches the second radio base station 12'-2. In this event, the reception ratio Eb/N0 of the upward communication channel received by the second radio base station 12'-2 exceeds the reference ratio Eb/N0. This is because the terminal 13 carries out transmission at the upward transmission power before control is made although propagation loss decreases because the terminal 13 approaches the second radio base station 12'-2. Inasmuch as the reception ratio Eb/N0 of the upward communication channel exceeds the reference ratio Eb/N0 in the second radio base station 12'-2, the second radio station 12'-2 transmits to the terminal 13 the second transmission power control signal indicative of lowering the upward transmission power. On the other hand, the reception ratio Eb/N0 of the upward communication channel received by the first radio base station 12'-1 is less than the reference ratio Eb/N0. This is because the terminal 13 carries out transmission at the upward transmission power before control is made although propagation loss increases because the terminal 13 is apart from the first radio base station 12'-1. Inasmuch as the reception ratio Eb/N0 of the upward communication channel is less than the reference ratio Eb/N0 in the first radio base station 12'-1, the first radio station 12'-1 transmits to the terminal 13 the first transmission power control signal indicative of raising the upward transmission power. On reception of the first and the second transmission power control signals, the terminal 13 lowers the upward transmission power for the upward communication channel signal because the terminal 13 complies with the second transmission power control signal supplied from the second radio base station 12'-2.

As a result, in general, the first radio base station 12'-1 has a signal quality of the upward communication channel from the terminal 13 that is less than that of the second radio base station 12'-2. However, inasmuch as temporal variation in strength of an electric wave frequently occurs in the mobile communication system, the radio base station with a shorter propagation distance may not always have a better signal quality.

For this purpose, the host station 11 is provided with the speech frame signal selecting section 15 for selecting a signal with a better quality on the basis of the speech data signal quality information 320 in the speech frame signals 300 transmitted from the the first and the second radio base stations 12'-1 and 12'-2.

Figure 6:
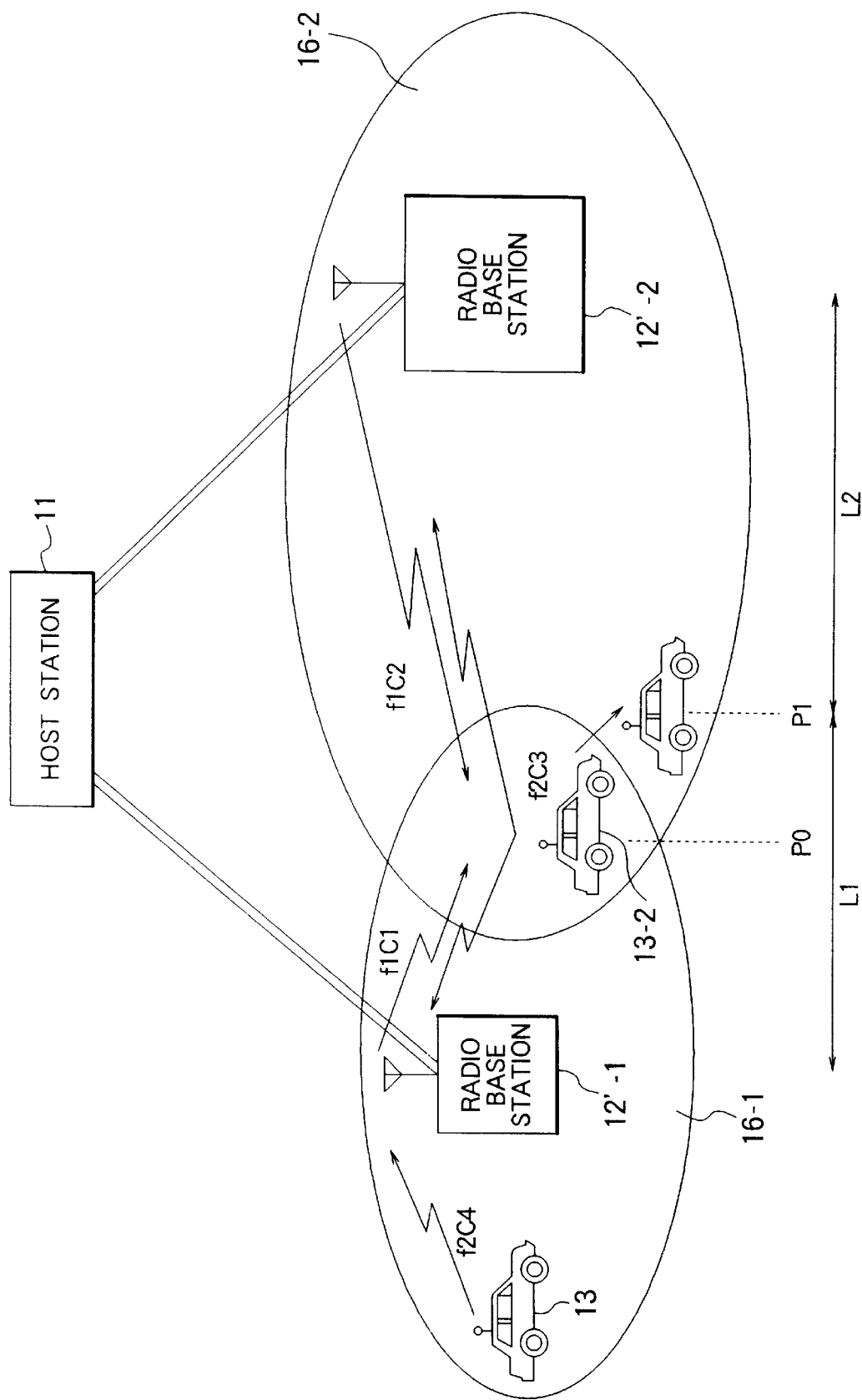
FIG. 6 shows another connection state in the CDMA type mobile communication system illustrated in FIG. 1 in a case of departing from an area of the soft hand-off.

Referring to FIG. 6, description will be made as regards problems in the conventional CDMA type mobile communication system of the CDMA system. In FIG. 6, the first radio base station 12'-1 covers the first cell 16-1 having a relatively small cell diameter while the second radio base station 12'-2 covers the second cell 16-2 having a relatively large cell diameter. A first terminal 13-1 communicates with the first radio base station 12'-1 alone. A second terminal 13-2 carries out soft hand-off between the first radio base station 12'-1 and the second radio base station 12'-2.

It is assumed that the second terminal 13-2 lies in an area of the soft hand-off at a position P0. In this event, the second terminal 13-2 can receive both of the first and the second downward communication channel signals from the first and the second radio base stations 12'-1 and 12'-2. Control of the upward transmission power is carried out in accordance with both of the first and the second transmission power control signals supplied from the first and the second radio base stations 12'-1 and 12'-2. Under the circumstances, the second radio base station 12'-2 cannot carry out reception operation to the second terminal 13-2 at sufficient energy in comparison with the first radio base station 12'-1. This is because there is a long distance between the second radio base station 12'-2 and the second terminal 13-2. In contrast with this, the first radio base station 12'-1 can carry out reception operation to the second terminal 13-2 at sufficient energy. As a result, the upward transmission power of the second terminal 13-2 is controlled mainly in accordance with the first transmission power control signal supplied from the first radio base station 12'-1. The reception ratio Eb/N0 of the second radio base station 12'-2 is kept in a state less than the reference ratio Eb/N0.

That is, although the second terminal 13-2 at the position P0 can receive both of the first and the second downward communication channel signals from the first and the second radio base stations 12'-1 and 12'-2, the first radio base station 12'-1 can receive from the second terminal 13-2 the upward communication channel signal having the reception ratio Eb/N0 satisfied with the reference ratio Eb/N0 while the second radio base station 12'-2 cannot receive from the second terminal 13-2 the upward communication channel signal having the reception ratio Eb/N0 satisfied with the reference ratio En/N0.

It will be presumed that the second terminal 13-2 shift from the position P0 to another position P1 in the second cell 16-2 that is close to the first cell 16-1 but is apart from the first cell 16-1. In other words, a first distance L1 between the second terminal 13-2 and the first radio base station 12'-1 is shorter than a second distance L2 between the second terminal 13-2 and the second radio base station 12'-2, namely:

$$L1 \ll L2.$$

In this event, the second terminal 13-2 can receive only the second downward communication channel signal from the second radio base station 12'-1 and control of the upward transmission power for the second terminal 13-2 is carried out in accordance with the second transmission power control signal supplied from the second radio base station 12'-2.

Inasmuch as the second terminal 13-2 is controlled by the second transmission power control signal supplied from the second radio base station 12'-2 which is a long distance (the second distance L2) from the second radio base station 12'-2, the first radio base station 12'-1 receives large energy from the second terminal 13-2 which is a short distance (the first distance L1) from the first radio base station 12'-1. The large energy serves as interference energy in the first radio base station 12'-1 and it results in lowering the reception ratio Eb/N0 for the first terminal 13-1 so as to be less than the reference ratio Eb/N0. As a result, the first radio base station 12'-1 controls the first terminal 13-1 so as to raise its upward transmission power.

For the above-mentioned reason, each terminal in the first cell 16-1 carries out transmission operation at extra electric power and it results in raising the interference energy in the first cell 16-1 further. As a result, subscriber capacity held in the first cell 16-1 decreases. In addition, inasmuch as it is necessary for each terminal in the first cell 16-1 to raise its transmission power and it results in increasing consumed power and in shortening the life of its battery.

Figure 7:
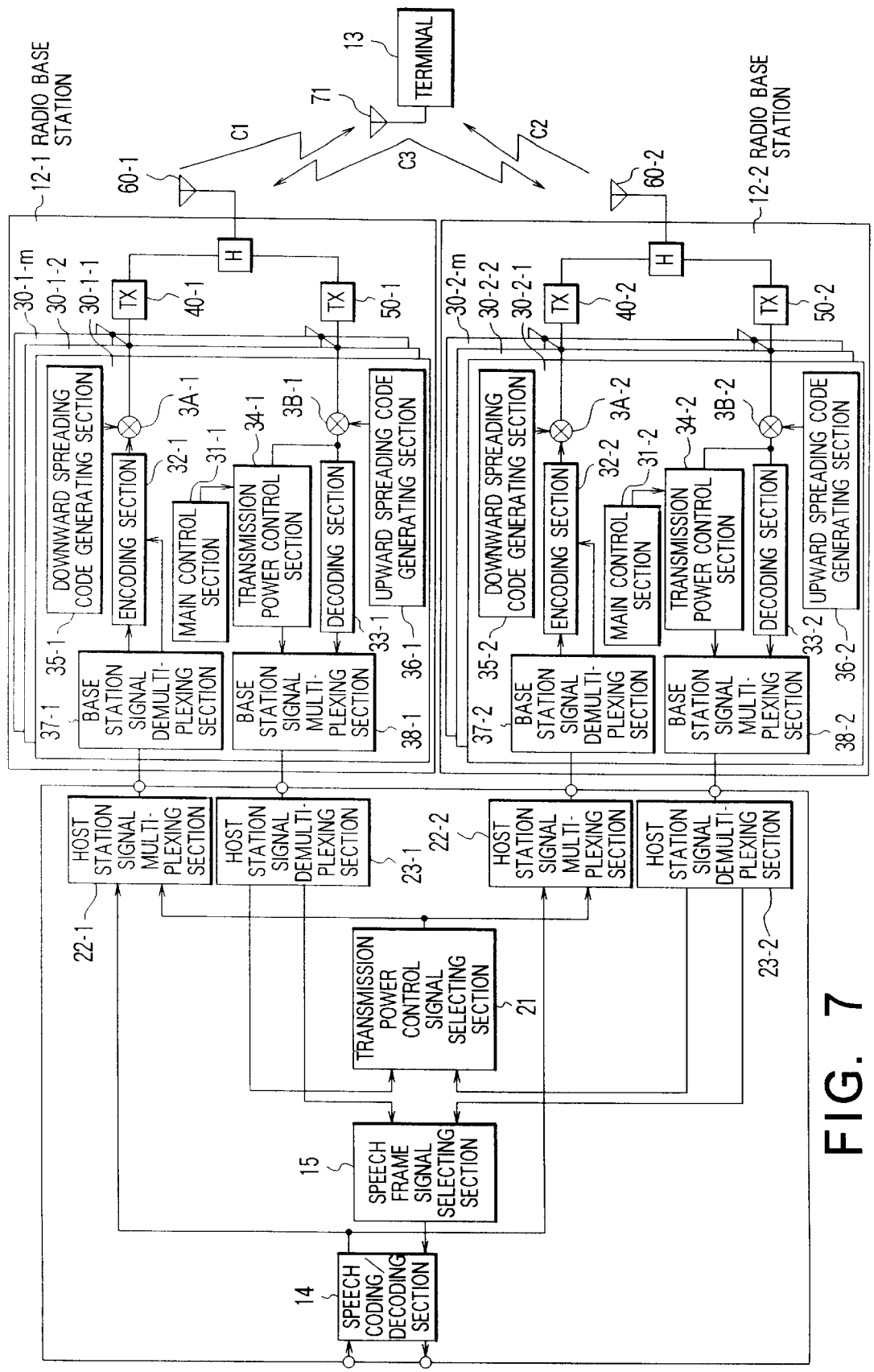
FIG. 7 is a block diagram of a CDMA type mobile communication system according to a first embodiment of this invention.

Referring to FIG. 7, the description will proceed to a CDMA type mobile communication system system according to a first embodiment of this invention. The illustrated CDMA type mobile communication system comprises a host station 11A, first and second radio base stations 12-1 and 12-2, and a terminal or mobile station 13. The host station 11A is connected to the first and the second radio base stations 12-1 and 12-2.

The host station 11A comprises not only the host station speech coding/decoding section 14 and the speech frame signal selecting section 15 but also a transmission power signal selecting section 21, first and second host station signal multiplexing sections 22-1 and 22-2, and first and second host station signal demultiplexing sections 23-1 and 23-2.

The host station speech coding/decoding section 14 codes a host input speech signal into a host transmission speech frame signal. In addition, the host station speech coding/decoding section 14 decodes a selected host reception speech frame signal (which will later become clear) into a host output speech signal.

The first host station signal demultiplexing section 23-1 is supplied from the first radio base station 12-1 with a first host input multiplexed signal which will later become clear. The first host station signal demultiplexing section 23-1 separates the first host input multiplexed signal into a first transmission power control signal and a first host reception speech frame signal. The first transmission power control signal is supplied to the transmission power signal selecting section 21 while the first host reception speech frame signal is supplied to the speech frame signal selecting section 15. Likewise, the second host station signal demultiplexing section 23-2 is supplied from the second radio base station 12-2 with a second host input multiplexed signal which will later become clear. The second host station signal demultiplexing section 23-2 separates the second host input multiplexed signal into a second transmission power control signal and a second host reception speech frame signal. The second transmission power control signal is supplied to the transmission power signal selecting section 21 while the second host reception speech frame signal is supplied to the speech frame signal selecting section 15.

The speech frame signal selecting section 15 selects, as the selected host reception speech frame signal, one of the first and the second host reception speech frame signals that has the best signal quality on the basis of the speech data signal quality information 320 included therein. The transmission power signal selecting section 21 selects, as a selected transmission power control signal, one of the first and the second transmission power control signals so as to make upward transmission power in the terminal 13 the lowest power level.

Each of the first and the second host station signal multiplexing sections 22-1 and 22-2 is supplied with the selected transmission power control signal and the host transmission speech frame signal from the transmission power signal selecting section 21 and the host station speech coding/decoding section 14, respectively. The first host station signal multiplexing section 22-1 multiplexes the host transmission speech frame signal and the selected transmission power control signal into a first host output multiplexed signal. Similarly, the second host station signal multiplexing section 22-2 multiplexes the host transmission speech frame signal and the selected transmission power control signal into a second host output multiplexed signal. The first and the second host output multiplexed signals are delivered to the first and the second radio base stations 12-1 and 12-2, respectively.

The first radio base station 12-1 comprises m first channel control sections 30-1-1, 30-1-2, . . . , and 30-1-m, a first base station transmitter (TX) 40-1, a first base station receiver (RX) 50-1, and a first base station antenna 60-1, where m represents an integer which is not less than two. The first base station transmitter 40-1 modulates each signal from the m first channel control sections 30-1-1 to 30-1-m. The first base station receiver 50-1 demodulates a signal from the terminal 13.

Each of the m first channel control sections 30-1-1 to 30-1-m comprises a first main control section 31-1, a first base station encoding section 32-1, a first base station decoding section 33-1, a first base station transmission power control section 34-1, a first base station downward spreading code generating section 35-1, a first base station upward spreading code generating section 36-1, a first base station signal demultiplexing section 37-1, a first base station signal multiplexing section 38-1, a first base station output multiplier 3A-1, and a first base station input multiplier 3B-1.

The first base station signal demultiplexing section 37-1 is supplied from the host station 11A with the first host output multiplexed signal as a first base station input multiplexed signal. The first base station signal demultiplexing section 37-1 separates the first base station input multiplexed signal into a first base station reception speech frame signal and the selected transmission power control signal. The first base station encoding section 32-1 encodes the first base station reception speech frame signal into a first encoded speech signal and then superimposes the selected transmission power control signal on the first encoded speech signal. The first base station downward spreading code generating section 35-1 generates a first base station intrinsic spreading code C1 which is a code for spreading an output signal from the first base station encoding section 32-1.

The first base station upward spreading code generating section 36-1 generates the terminal intrinsic spreading code which is a code for correlation demodulating an output signal from the first base station receiver 50-1. The first base station decoding section 33-1 decodes a first base station correlation demodulated signal into a first base station output speech frame signal which comprises speech data and quality information for the speech data. The first base station transmission power control section 34-1 calculates, on the basis of the first base station correlation demodulated signal, a first reception ratio Eb/N0 which is a ratio of reception energy to interference energy in an upward communication channel signal. The first base station transmission power control section 34-1 is supplied from the first main control section 31-1 with a first reference ratio Eb/N0. The first base station transmission power control section 34-1 compares the first reception ratio Eb/N0 with the first reference ratio Eb/N0 to a first transmission power control signal for an upward communication channel. The first base station signal multiplexing section 38-1 multiplexes the first base station output speech frame signal and the first transmission power control signal into a first base station output multiplexed signal. The first base station output multiplexed signal is supplied to the host station 11A as the first host input multiplexed signal which is described above.

The second radio base station 12-2 is similar in structure to the first radio base station 12-1. That is, the second radio base station 12-2 comprises m second channel control sections 30-2-1, 30-2-2, . . . , and 30-2-m, a second base station transmitter (TX) 40-2, a second base station receiver (RX) 50-2, and a second base station antenna 60-2. The second base station transmitter 40-2 modulates each signal from the m second channel control sections 30-2-1 to 30-2-m. The second base station receiver 50-2 demodulates a signal from the terminal 13.

Each of the m second channel control sections 30-2-1 to 30-2-m comprises a second main control section 31-2, a second base station encoding section 32-2, a second base station decoding section 33-2, a second base station transmission power control section 34-2, a second base station downward spreading code generating section 35-2, a second base station upward spreading code generating section 36-2, a second base station signal demultiplexing section 37-2, a second base station signal multiplexing section 38-2, a second base station output multiplier 3A-2, and a second base station input multiplier 3B-2.

The second base station signal demultiplexing section 37-2 is supplied from the host station 11A with the second host output multiplexed signal as a second base station input multiplexed signal. The second base station signal demultiplexing section 37-2 separates the second base station input multiplexed signal into a second base station reception speech frame signal and the selected transmission power control signal. The second base station encoding section 32-2 encodes the second base station reception speech frame signal into a second encoded speech signal and then superimposes the selected transmission power control signal on the second encoded speech signal. The second base station downward spreading code generating section 35-2 generates a second base station intrinsic spreading code which is a code for spreading an output signal from the second base station encoding section 32-2.

The second base station upward spreading code generating section 36-2 generates the terminal intrinsic spreading code which is a code for correlation demodulating an output signal from the second base station receiver 50-2. The second base station decoding section 33-2 decodes a second base station correlation demodulated signal into a second base station output speech frame signal which comprises speech data and quality information for the speech data. The second base station transmission power control section 34-2 calculates, on the basis of the second base station correlation demodulated signal, a second reception ratio Eb/N0 which is a ratio of reception energy to interference energy in the upward communication channel signal. The second base station transmission power control section 34-2 is supplied from the second main control section 31-2 with a second reference ratio Eb/N0. The second base station transmission power control section 34-2 compares the second reception ratio Eb/N0 with the second reference ratio Eb/N0 to a second transmission power control signal for the upward communication channel. The second base station signal multiplexing section 38-2 multiplexes the second base station output speech frame signal and the second transmission power control signal into a second base station output multiplexed signal. The second base station output multiplexed signal is supplied to the host station 11A as the second host input multiplexed signal which is described above.

Figure 8:
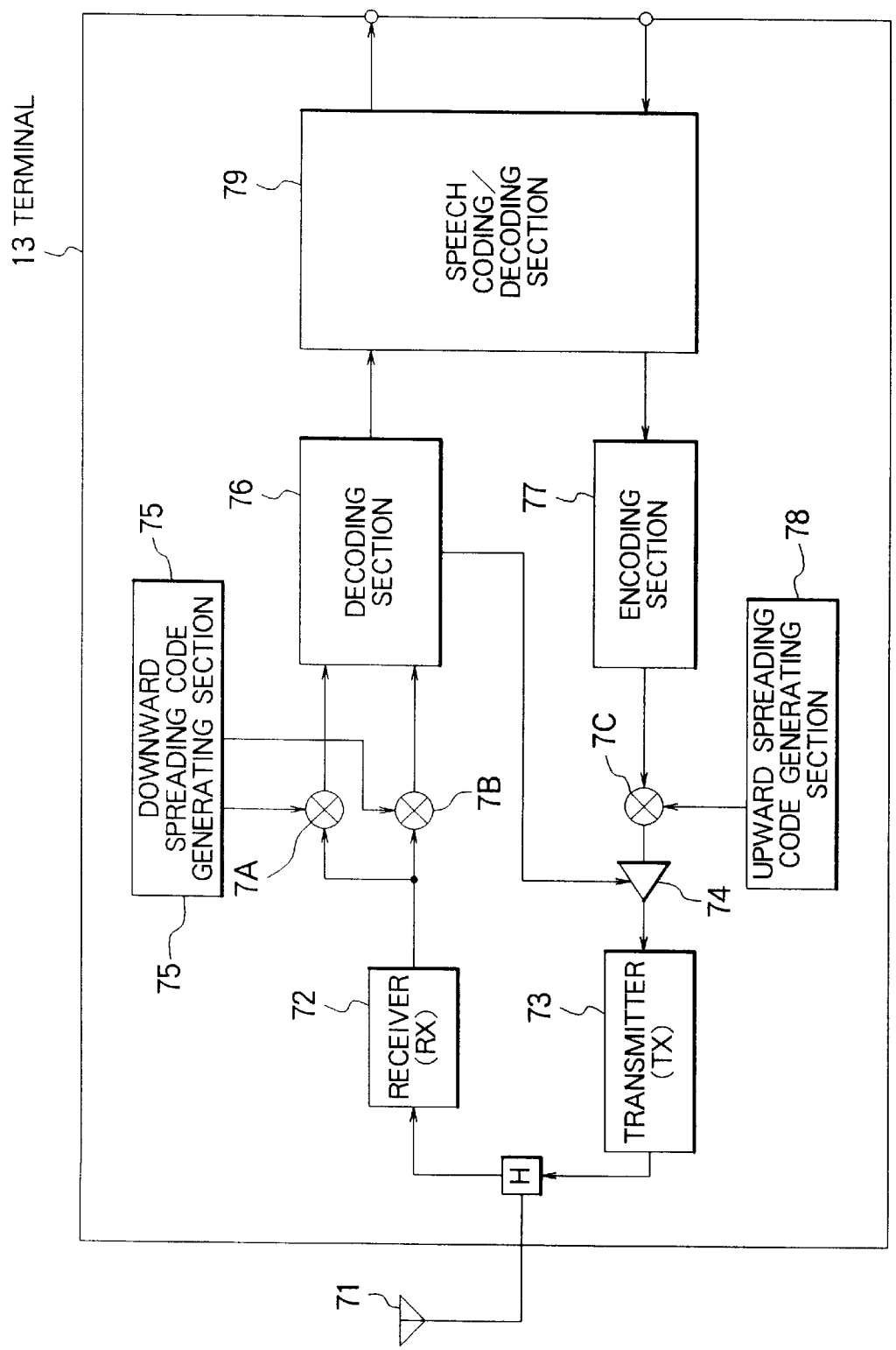
FIG. 8 is a block diagram of a terminal (mobile station) for use in the CDMA type mobile communication system illustrated in FIG. 7.

Turning to FIG. 8, the terminal 13 is similar in structure to that illustrated in FIG. 4. That is, the terminal 13 comprises the terminal antenna 71, the terminal receiver (RX) 72, the terminal transmitter (TX) 73, the output gain control section 74, the terminal downward spreading code generating section 75, the terminal decoding section 76, the terminal encoding section 77, the terminal upward spreading code generating section 78, the terminal speech coding/decoding section 79, and the first through the third multipliers 7A, 7B, and 7C.

The terminal receiver 72 receives the first and the second downward communication channel signals from the first and the second radio base stations 12-1 and 12-2 via the terminal antenna 71. The terminal receiver 72 demodulates the first and the second downward communication channel signals into a terminal demodulated signals, respectively. The terminal downward spreading code generating section 75 generates first and second base station intrinsic spreading codes C1 and C2 for use in correlation demodulating the terminal demodulated signal for the first and the second radio base stations 12-1 and 12-2. The first multiplier 7A correlation demodulates the terminal demodulated signal using the first base station intrinsic spreading code C1 to produce a first terminal correlation demodulated signal. The second multiplier 7B correlation demodulates the terminal demodulated signal using the second base station intrinsic spreading code C2 to produce a second terminal correlation demodulated signal. The terminal decoding section 76 decodes the first and the second terminal correlation demodulated signals into a terminal decoded signal and then separates the terminal decoded signal into a terminal reception speech frame signal and the selected transmission power control signal. The terminal speech coding/decoding section 79 converts the terminal reception speech frame signal into a terminal output speech signal.

In addition, the terminal speech coding/decoding section 79 is supplied with a terminal input speech signal. The terminal speech coding/decoding section 79 converts the terminal input speech signal into a terminal transmission speech frame signal. The terminal encoding section 77 encodes the terminal transmission speech frame signal into a terminal encoded signal. The terminal upward spreading code generating section 78 generates the terminal intrinsic spreading code C3. The third multiplier 7C spreads the terminal encoded signal using the terminal intrinsic spreading code C3 to produce a terminal spread signal. The terminal spread signal is supplied to the output gain control section 74 which is supplied with the selected transmission power control signal from the terminal decoding section 76. The output gain control section 74 controls upward transmission power of the terminal spread signal for the upward communication channel on the basis of the selected transmission power control signal to produce a power controlled signal. The terminal transmitter 73 modulates a third carrier signal with the power controlled signal to produce a terminal modulated signal which is transmitted to the first and the second radio base stations 12-1 and 12-2 from the terminal antenna 71 as an upward communication channel signal.

Referring to FIGS. 7 and 8, the description will proceed to operation of the CDMA type mobile communication system. It is assumed that the terminal 13 communicates with the first and the second radio base stations 12-1 and 12-2. Accordingly, the upward communication channel signal transmitted from the terminal 13 is received in both of the first radio base station 12-1 and the second radio base station 12-2.

In the first radio base station 12-1, the first base station receiver 50-1 receives the upward communication channel signal via the first base station antenna 60-1 and demodulates it into a first base station demodulated signal. With respect to the first base station demodulated signal, one of the first channel control sections 30-1 (suffix omitted) is assigned every terminal 13. In the first channel control section 30-1, the first base station demodulated signal is supplied to the first base station input multiplier 3B-1. The first base station input multiplier 3B-1 correlation demodulates the first base station demodulated signal using the terminal intrinsic spreading code C3 supplied from the the first base station upward spreading code generating section 36-1 to produce the first base station correlation demodulated signal. The first base station correlation demodulated signal is supplied to the first transmission power control section 34-1 and to the first base station decoding section 33-1. Responsive to the first base station correlation demodulated signal, the first transmission power control section 34-1 measures a first reception ratio Eb/N0 which is a ratio of reception energy to interference energy per bit in the upward communication channel signal. Subsequently, the first transmission power control section 34-1 compares the first reception ratio Eb/N0 with a reference ratio Eb/N0 set by the first main control section 31-1 to produce a first transmission power control signal for controlling the upward transmission power of the terminal 13. The reference ratio Eb/N0 set by the first main control section 31-1 has the same value in all of the first channel control sections 30-1-1 to 30-1-m so as to maintain the same communication quality in all terminals.

Specifically, when the first reception ratio Eb/N0 is greater than the reference ratio Eb/N0, the first transmission power control section 34-1 produces the first transmission power control signal indicative of lowering the upward transmission power. This is because the terminal 13 transmits the upward communication channel signal at excess transmission power. Conversely, if the first reception ratio Eb/N0 is less than the reference ratio Eb/N0, the first transmission power control section 34-1 produces the first transmission power control signal indicative of raising the upward transmission power. This is because the terminal 13 transmits the upward communication channel signal at insufficient transmission power.

The first base station decoding section 33-1 decodes the first base station correlation demodulated signal into the first base station output speech frame signal. The first base station signal multiplexing section 38-1 multiplexes the first base station output speech frame signal and the first transmission power control signal into the first base station output multiplexed signal. The first base station output multiplexed signal is supplied to the host station 11A as the first host input multiplexed signal.

Likewise, the second radio base station 12-2 receives the upward communication channel signal from the terminal 13 and transmits to the host station 11A the second base station output speech frame signal and the second transmission power control signal multiplexed.

More specifically, the second base station receiver 50-1 receives the upward communication channel signal via the second base station antenna 60-2 and demodulates it into a second base station demodulated signal. With respect to the second base station demodulated signal, one of the second channel control sections 30-2 (suffix omitted) is assigned every terminal 13. In the second channel control section 30-2, the first base station demodulated signal is supplied to the second base station input multiplier 3B-1. The second base station input multiplier 3B-1 correlation demodulates the second base station demodulated signal using the terminal intrinsic spreading code C3 supplied from the the second base station upward spreading code generating section 36-2 to produce the second base station correlation demodulated signal. The second base station correlation demodulated signal is supplied to the second transmission power control section 34-2 and to the second base station decoding section 33-2. Responsive to the second base station correlation demodulated signal, the second transmission power control section 34-2 measures the second reception ratio Eb/N0 which is the ratio of reception energy to the interference energy per bit in the upward communication channel signal. Subsequently, the second transmission power control section 34-2 compares the second reception ratio Eb/N0 with the reference ratio Eb/N0 set by the second main control section 31-2 to produce the second transmission power control signal for controlling the upward transmission power of the terminal 13. The reference ratio Eb/N0 set by the second main control section 31-2 has the same value in all of the second channel control sections 30-2-1 to 30-2-m so as to maintain the same communication quality in all terminals.

Specifically, when the second reception ratio Eb/N0 is greater than the reference ratio Eb/N0, the second transmission power control section 34-2 produces the second transmission power control signal indicative of lowering the upward transmission power. This is because the terminal 13 transmits the upward communication channel signal at excess transmission power. Conversely, if the second reception ratio Eb/N0 is less than the reference ratio Eb/N0, the second transmission power control section 34-2 produces the second transmission power control signal indicative of raising the upward transmission power. This is because the terminal 13 transmits the upward communication channel signal at insufficient transmission power.

The second base station decoding section 33-2 decodes the second base station correlation demodulated signal into the second base station output speech frame signal. The second base station signal multiplexing section 38-2 multiplexes the second base station output speech frame signal and the second transmission power control signal into the second base station output multiplexed signal. The second base station output multiplexed signal is supplied to the host station 11A as the second host input multiplexed signal.

In the host station 11A, the first and the second host station signal demultiplexing sections 23-1 and 23-2 receive the first and the second host input multiplexed signals from the first and the second radio base stations 12-1 and 12-2, respectively. The first host station signal demultiplexing section 23-1 separates the first host input multiplexed signal into the first transmission power control signal and the first host reception speech frame signal. Likewise, the second host station signal demultiplexing section 23-1 separates the second host input multiplexed signal into the second transmission power control signal and the second host reception speech frame signal. The first and the second host reception speech frame signals are supplied to the speech frame signal selecting section 15 while the first and the second transmission power control signals are supplied to the transmission power signal selecting section 21.

The speech frame signal selecting section 15 selects, as the selected reception speech frame signal, one of the first and the second reception speech frame signals that has the best signal quality on the basis of the speech data signal quality information included therein. The selected reception speech frame signal is sent to the host station speech coding/decoding section 14. As shown in FIG. 4, the selected reception speech frame signal comprises the speech data and the speech data signal quality information. The host station speech coding/decoding section 14 converts the selected reception speech frame signal into the host output speech signal.

The transmission power signal selecting section 21 selects, as the selected transmission power control signal, one of the first and the second transmission power control signals so as to make the upward transmission power in the terminal 13 the lowest power level.

Figure 9:
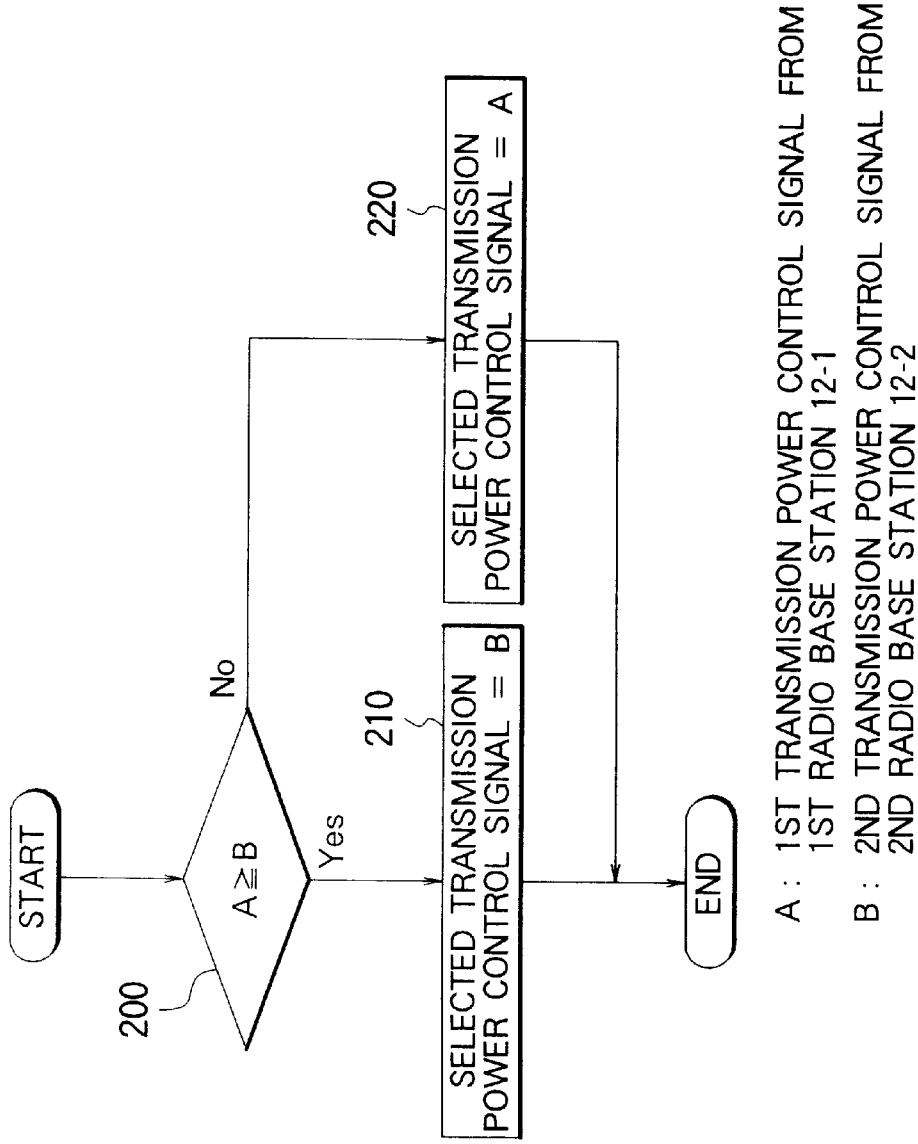
FIG. 9 shows a flow chart for use in describing operation of the CDMA type mobile communication system illustrated in FIG. 7.

Temporarily referring to FIG. 9, the description will proceed to processing in the transmission power control signal selecting section 21. The first transmission power control signal is denoted at A while the second transmission power control signal is denoted at B. The transmission power control signal section 21 first compares the first transmission power control signal A with the second transmission power control signal B at a step 200. If the first transmission power control signal A is not less than the second transmission power control signal B, the step 200 is succeeded by a step 210 at which the transmission power control signal selecting section 21 selects the second transmission power control signal B as the selected transmission power control signal. If the second transmission power control signal B is greater than the first transmission power control signal A, the step 200 is followed by a step 220 at which the transmission power control signal selecting section 21 selects the first transmission power control signal A as the selected transmission power control signal.

As apparent from the above-mentioned processing, when any one radio base station makes control so as to lower the upward transmission power from the terminal, the host station makes all radio base stations transmit the selected transmission power control signal indicative of lowering the upward transmission power. In other words, only when all radio base stations require the terminal to raise the upward transmission power, the selected transmission power control signal indicative of raising the upward transmission power is sent to the terminal from all radio base stations.

The host station speech coding/decoding section 14 converts the host input speech signal into the host transmission speech frame signal. The host transmission speech frame signal is supplied to both of the first and the second host station signal multiplexing sections 22-1 and 22-2 which are supplied with the selected transmission power control signal from the transmission power control signal selecting section 21 in the manner which is described above. The first host station signal multiplexing station 22-1 multiplexes the host transmission speech frame signal and the selected transmission power control signal into the first host output multiplexed signal. Similarly, the second host station signal multiplexing station 22-2 multiplexes the host transmission speech frame signal and the selected transmission power control signal into the second host output multiplexed signal. The first and the second host output multiplexed signals are delivered to the first and the second radio base stations 12-1 and 12-2, respectively.

In the first base station 12-1, the first host output multiplexed signal is received by the first base station signal demultiplexing section 37-1 as the first base station input multiplexed signal. The first base station signal demultiplexing section 37-1 separates the first base station input multiplexed signal into the first base station reception speech frame signal and the selected transmission power control signal which are supplied to the first base station encoding section 32-1. The first base station encoding section 32-1 encodes the first base station reception speech frame signal into the first encoded speech signal and then superimposes the selected transmission power control signal on the first encoded speech signal to produce a first encoder output signal. The first encoder output signal is supplied to the first base station output multiplier 3A-1 which is supplied with the first base station intrinsic spreading code C1 from the first base station downward spreading code generating section 35-1. The first base station output multiplier 3A-1 spreads the first encoder output signal using the first base station downward spreading code C1 to produce the first base station spread signal. The first base station spread signal is supplied to the first base station transmitter 40-1. The first base station transmitter 40-1 modulates a first carrier signal with the first base station spread signal to produce a first base station modulated signal. The first base station modulated signal is transmitted from the first base station antenna 60-1 to the terminal 13 as the first downward communication channel signal.

Similarly, the second base station 12-2 spreads the speech frame signal and the selected transmission power control signal using the second base station intrinsic spreading code C2 and transmits it from the second base station antenna 60-2.

More specifically, the second host output multiplexed signal is received by the second base station signal demultiplexing section 37-2 as the second base station input multiplexed signal. The second base station signal demultiplexing section 37-2 separates the second base station input multiplexed signal into the second base station reception speech frame signal and the selected transmission power control signal which are supplied to the second base station encoding section 32-2. The second base station encoding section 32-2 encodes the second base station reception speech frame signal into the second encoded speech signal and then superimposes the selected transmission power control signal on the second encoded speech signal to produce a second encoder output signal. The second encoder output signal is supplied to the second base station output multiplier 3A-2 which is supplied with the second base station intrinsic spreading code C2 from the second base station downward spreading code generating section 35-2. The second base station output multiplier 3A-2 spreads the second encoder output signal using the second base station downward spreading code C2 to produce the second base station spread signal. The second base station spread signal is supplied to the second base station transmitter 40-2. The second base station transmitter 40-2 modulates a second carrier signal with the second base station spread signal to produce a second base station modulated signal. The second base station modulated signal is transmitted from the second base station antenna 60-2 to the terminal 13 as the second downward communication channel signal.

Transmitted from the first and the second radio base stations 12-1 and 12-2, the first and the second downward communication channel signals are received in the terminal receiver 72 via the terminal antenna 71 of the terminal 13. The terminal receiver 72 demodulates the first and the second downward communication channel signals into the terminal demodulated signal. The terminal demodulated signal is supplied to the first and the second multiplier 7A and 7B in common. The first and the second multiplier 7A and 7B are supplied from the terminal downward spreading code generating section 75 with the first and the second base station intrinsic spreading codes C1 and C2, respectively. The first multiplier 7A correlation demodulates the terminal demodulated signal using the first base station intrinsic spreading code C1 to produce the first terminal correlation demodulated signal. Likewise, the second multiplier 7B correlation demodulates the terminal demodulated signal using the second base station intrinsic spreading code C2 to produce the second terminal correlation demodulated signal.

It is noted that the base station intrinsic spreading code to be set in the terminal downward spreading code generateing section 75 is delivered from the host station 11A each time the host station 11A assigns the communication channel to the terminal 13. On soft hand-off where the terminal 13 simultaneously communicates with two different radio base stations, two different spreading codes are assigned to the terminal 13 by the host station 11A and therefore the terminal downward spreading code generating section 75 generates the two different spreading codes.

The first and the second terminal correlation demodulated signals are supplied to the terminal decoding section 76. The terminal decoding section 76 decodes the first and the second terminal correlation demodulated signals into the terminal decoded signal. Subsequently, the terminal decoding section 76 separates the terminal decoded signal into the terminal reception speech frame signal and the selected transmission power control signal. The terminal reception speech frame signal is supplied to the terminal speech coding/decoding section 79 while the selected transmission power control signal is supplied to the output gain control section 74. The terminal speech coding/decoding section 79 converts the terminal reception speech frame signal into the terminal output speech signal.

Attention is now directed to a communication signal from the terminal 13 to the host station 11A. The terminal input speech signal is supplied to the terminal speech coding/decoding section 79. The terminal speech coding/decoding section 79 converts the terminal input speech signal into the terminal transmission speech frame signal. The terminal transmission speech frame signal is supplied to the terminal encoding section 77. The terminal encoding section 77 encodes the terminal transmission speech frame signal into the terminal encoded signal. The terminal encoded signal is supplied to the third multiplier 7C which is supplied with the terminal intrinsic spreading code C3 from the terminal upward spreading code generating section 78. The third multiplier 7C spreads the terminal encoded signal using the terminal intrinsic spreading code C3 to produce the terminal spread signal. The terminal spread signal is supplied to the output gain control section 74 which is supplied with the selected transmission power control signal from the terminal decoding section 76. The output gain control section 74 controls the upward transmission power of the terminal spread signal on the basis of the selected transmission power control signal to produce the power controlled signal. The power controlled signal is supplied to the terminal transmitter 73. The terminal transmitter 73 modulates the third carrier signal with the power controlled signal to produce the terminal modulated signal. The terminal modulated signal is transmitted from the terminal antenna 71 to the first and the second radio base stations 12-1 and 12-2 as the upward communication channel signal.

In the manner which is described above, the reception ratio Eb/N0 is maintained the reference radio Eb/N0 in each radio base station.

The description will proceed to merits in the CDMA type mobile communication system according to the first embodiment of this invention. A signal from a terminal is received in two radio base stations. Each radio base station generates, on the basis of reception energy, a transmission power control signal for controlling upward transmission power of the terminal and transmits it to a host station. The host station selects, as a selected transmission power control signal, one of two transmission power control signals that makes upward transmission power for the terminal the lowest power level and transmits it to the two radio base stations. As a result, it is possible to realize soft hand-off between cells having different cell diameters without decreasing subscriber capacity held in each cell. In addition, it is possible to inhibit the upward transmission power in the terminal to lower consumed power. As a result, it is possible to make the life of a battery of the terminal longer.

Figure 10:
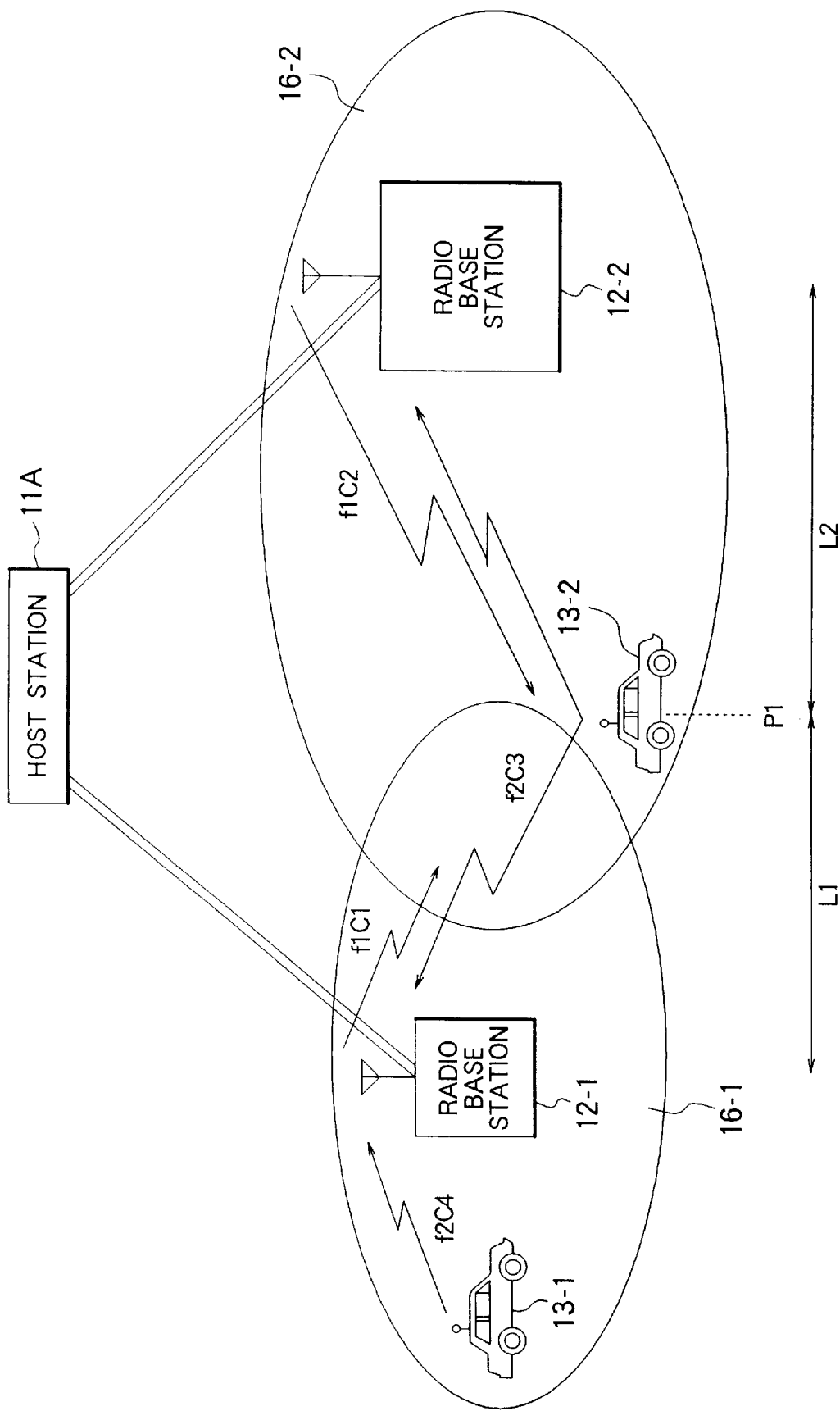
FIG. 10 shows a connection state in the CDMA type mobile communication system illustrated in FIG. 7 in a case of departing from an area of soft hand-off.

Referring to FIG. 10, the description will proceed to operation of the mobile communication system illustrated in FIG. 7 in more detail. In FIG. 10, the first radio base station 12-1 covers the first cell 16-1 having a relatively small cell diameter while the second radio base station 12-2 covers the second cell 16-2 having a relatively large diameter. As shown in FIG. 10, the first and the second cells 16-1 and 16-2 are overlapped with each other. A first terminal 13-1 communicates with the first radio base station 12-1 alone. A second terminal 13-2 carries out communication by shifting from a position P0 (FIG. 6) to another position P1 in the second cell 16-2. A first distance Li between the second terminal 13-2 (the position P1) and the first radio base station 12'-1 is shorter than a second distance L2 between the second terminal 13-2 (the position P1) and the second radio base station 12'-2, namely, L1<<L2. In other words, the position P1 closes to the first cell 16-1 but is apart from the first cell 16-1. That is, the second terminal 13-2 communicates at the position P1 which is nearer the first radio base station 12-1 than the second radio base station 12-2.

Transmitted from the second terminal 13-2, the upward communication channel signal is received by both of the first radio base station 12-1 and the second radio base station 12-2. It is assumed that reception ratio Eb/N0 in the first radio base station 12-1 is equal to 5 dB and reception ratio Eb/N0 in the second radio base station 12-2 is equal to 2 dB. That is, the reception ratio Eb/N0 in the second radio base station 12-2 is less than that in the first radio base station 12-1. This is because the second radio base station 12-2 has a larger propagation loss in comparison with the first radio base station 12-1. It is also assumed that the reference ratio Eb/N0 of 7dB is set in both of the first and the second radio base stations 12-1 and 12-2 because of keeping signal quality of the upward communication channel at error rate of 1%. Under the circumstances, the first radio base station 12-1 generates the first transmission control signal indicative of raising the upward transmission power of the second terminal 13-2 by (7–5) dB or 2 dB and transmits it to the host station 11A. In contrast with this, the second radio base station 12-2 generates the second transmission control signal indicative of raising the upward transmission power of the second terminal 13-2 by (7—2) dB or 5 dB and transmits it to the host station 11A.

The host station 11A selects, as the selected transmission power control signal, the first transmission power control signal so as to make the upward transmission power of the second terminal 13-2 the most low. The host station 11A transmits the selected transmission power control signal (or the first transmission power control signal indicative of lowering the upward transmission power of the second terminal 13-2 by 2 dB) to the second terminal 13-2 through the second radio base station 12-2. Responsive to the selected transmission power control signal, the second terminal 13-2 raises its upward transmission power by 2 dB. Inasmuch as the second terminal 13-2 raises its upward transmission power by 2 dB, the reception ratio Eb/N0 in the first radio base station 12-2 is equal to the reference ratio Eb/N0 of 7 dB.

Figure 11:
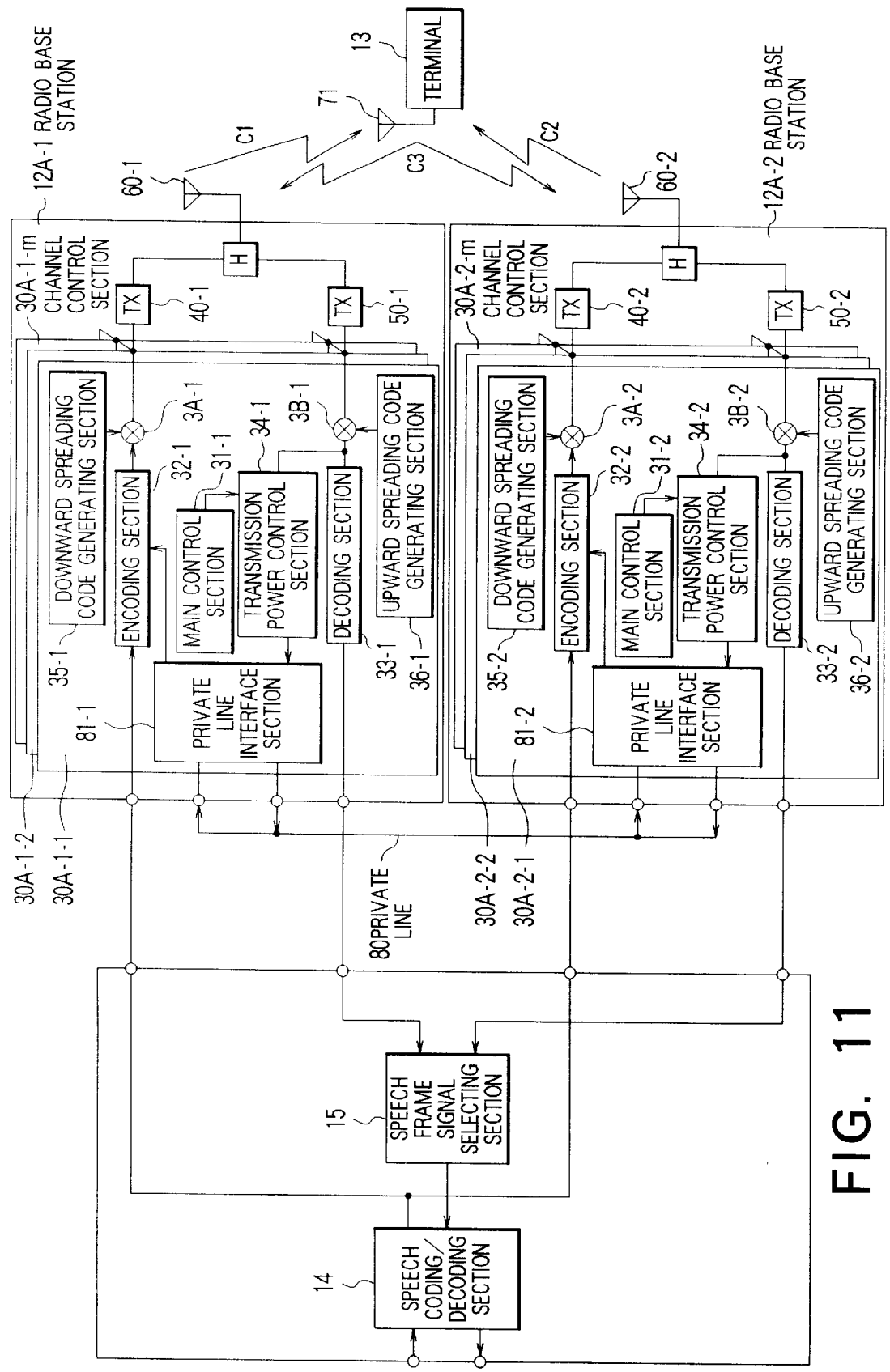
FIG. 11 is a block diagram of a CDMA type mobile communication system according to a second embodiment of this invention.

Referring to FIG. 11, the description will proceed to a CDMA type mobile communication system according to a second embodiment of this invention. The illustrated mobile communication system comprises the host station 11, first and second radio base stations 12A-1 and 12A-2, the terminal 13, and a private or leased line 80. The first and the second radio base stations 12A-1 and 12A-2 are connected to each other by the private line 80. That is, transmission/reception of the transmission power control signal is carried out via the private line 80.

The host station 11 is similar in structure to that illustrated in FIG. 1. The first and the second radio base stations 12A-1 and 12A-2 are similar in structure to the first and the second radio base station 12-1 and 12-2 illustrated in FIG. 7 except that the channel control sections in the first and the second radio base station 12-1 and 12-2 are modified in the manner which will become clear as the description proceeds. The first radio base station 12A-1 includes m first channel control sections 30A-1-1, 30-A-1-2, . . . , and 30A-1-m while the second radio base station 12A-2 includes m second channel control sections 30A-2-1, 30-A-2-2, . . . , and 30A-2-m.

Each of the m first channel control sections 30A-1-1 to 30A-1-m in the first radio base station 12A-1 is similar in structure to each of the m first channel control sections 30-1-1 to 30-1-m in the first radio base station 12-1 except that it comprises a first private line interface section 81-1 in lieu of the first base station signal demultiplexing section 37-1 and the first base station signal multiplexing section 38-1. Likewise, each of the m second channel control sections 30A-2-1 to 30A-2-m in the second radio base station 12A-2 is similar in structure to each of the m second channel control sections 30-2-1 to 30-2-m in the second radio base station 12-2 except that it comprises a second private line interface section 81-2 in lieu of the second base station signal demultiplexing section 37-2 and the second base station signal multiplexing section 38-2.

It is assumed that the terminal 13 is assigned with a terminal identification number while the first and the second radio base stations 12A-1 and 12A-2 are assigned with first and second base station identification numbers, respectively.

In the first radio base station 12A-1, the first private line interface section 81-1 generates a first transmission power control packet by adding the terminal identification number and the first base station identification number to the first transmission power control signal sent from the first transmission control section 34-1 and transmits the first transmission power control packet to the private line 80. The first private line interface section 81-1 searches for the transmission power control packets having the terminal identification number to receive them. After all of the transmission power control packets having the terminal identification number are collected, the first private line interface section 81-1 selects, as a selected transmission power control signal, one of their transmission power control packets that lowers the upward transmission power in the terminal 13 to the lowest power level and then sends the selected transmission power control signal to the first base station encoding section 32-1.

Similarly, in the second radio base station 12A-2, the second private line interface section 81-2 generates a second transmission power control packet by adding the terminal identification number and the second base station identification number to the second transmission power control signal sent from the second transmission control section 34-2 and transmits the second transmission power control packet to the private line 80. The second private line interface section 81-2 searches for the transmission power control packets having the terminal identification number to receive them. After all of the transmission power control packets having the terminal identification number are collected, the second private line interface section 81-2 selects, as a selected transmission power control signal, one of their transmission power control packets that lowers the upward transmission power in the terminal 13 to the lowest power level and then sends the selected transmission power control signal to the second base station encoding section 32-1.

The host station 11 delivers to the first and the second radio base stations 12A-1 and 12A-2 a signal indicative of the radio base stations communicating with the the terminal 13 using the terminal identification number and the base station identification numbers. As a result, each radio base station can recognize how many transmission power control packets are sent each terminal identification number.

The private line 80 connecting the first radio base station 12A-1 with the second radio base station 12A-2 may be a local area network (LAN).

The description will proceed to operation of the CDMA type mobile communication system illustrated in FIG. 11. Inasmuch as operation for generating the first and the second transmission power control signals are similar to that described in conjunction with FIGS. 7 and 8, description thereof is omitted.

In the first radio base station 12A-1, the first private interface section 81-1 is supplied with the first transmission power control signal generated by the first transmission power control section 34-1. The first private line interface section 81-1 adds the terminal identification number for the terminal 13 and the first base station identification number for the first radio base station 12A-1 to the first transmission power control signal to produce the first transmission power control packet and transmits the first transmission power control packet to the private line 80.

The second radio base station 12A-2 carries out similar operation in the first radio base station 12A-2. Specifically, the second private interface section 81-2 is supplied with the second transmission power control signal generated by the second transmission power control section 34-2. The second private line interface section 81-2 adds the terminal identification number for the terminal 13 and the second base station identification number for the second radio base station 12A-2 to the second transmission power control signal to produce the second transmission power control packet and transmits the second transmission power control packet to the private line 80.

Each of the first and the second private line interface sections 81-1 and 81-2 of the first and the second radio base stations 12A-1 and 12A-2 searches for the transmission power control packets having the terminal identification number in the transmission power control packets flowing on the private line 80 to receive them. In this event, each of the first and the second private line interface sections 81-1 and 81-2 determines whether or not all of the transmission power control packets having the terminal identification number on the basis of the base station identification numbers each terminal identification number delivered from the host station 11.

After all of the transmission power control packets having the terminal identification number are collected, the first and the second private line interface sections 81-1 and 81-2 select, as the selected transmission power control signal, one of the transmission power control packets that lowers the upward transmission power in the terminal 13 to the lowest power level and send the selected transmission power control signal to the first and the second base station encoding sections 32-1 and 32-2, respectively. A following operation where the selected transmission power control signal is sent from the first and the second encoding sections 32-1 and 32-2 to the terminal 13 and the upward transmission power of the terminal 13 is controlled is similar to those described in conjunction with FIGS. 7 and 8, description thereof is omitted.

Figure 12:
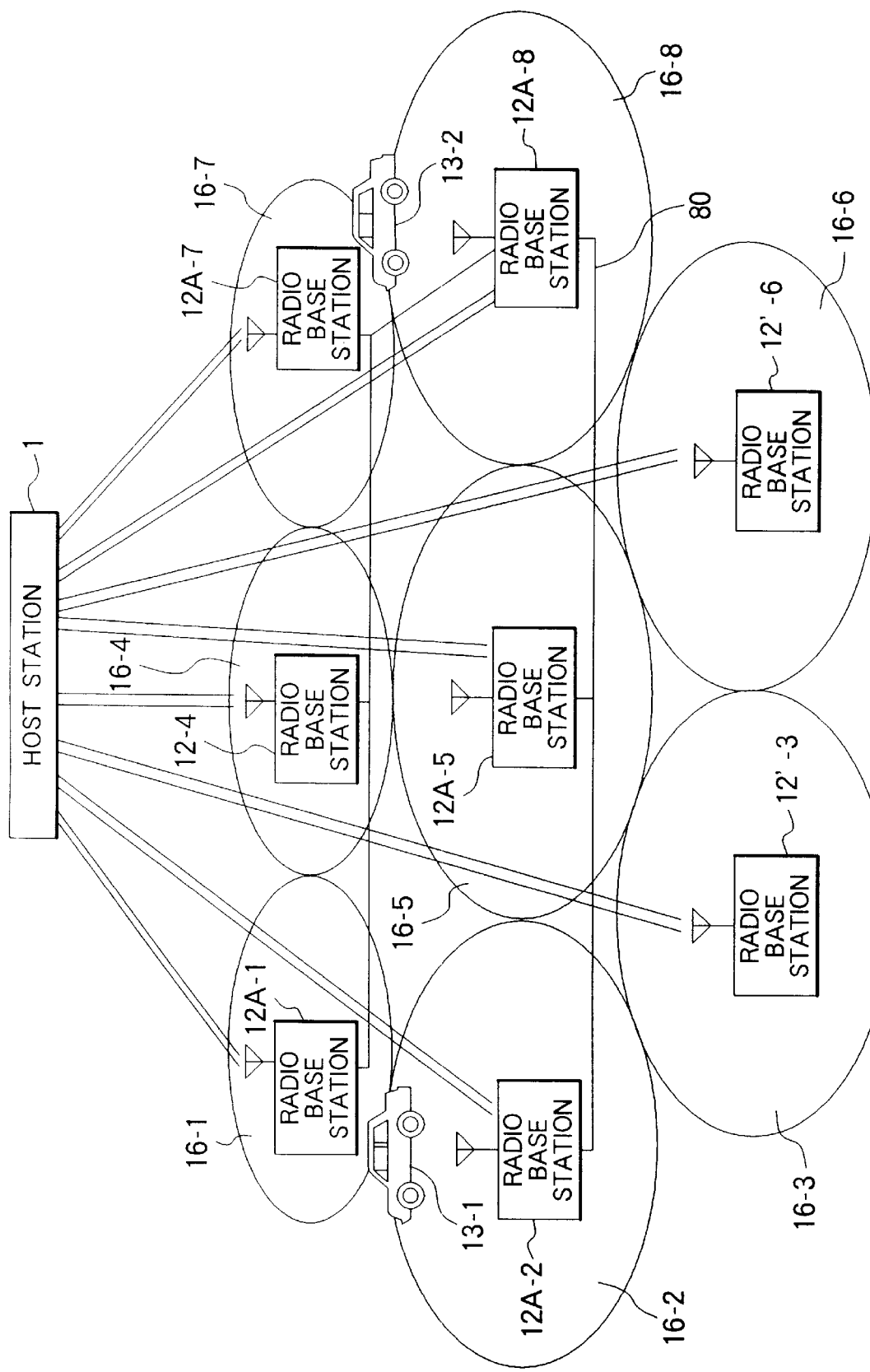
FIG. 12 shows a connection state in the CDMA type mobile communication system according to the second embodiment of this invention.

Referring to FIG. 12, the description will proceed to operation of the mobile communication system illustrated in FIG. 11 in more detail. In FIG. 12, the illustrated CDMA type mobile communication system comprises first through eighth radio base stations 12A-1, 12A-2, 12'-3, 12A-4, 12A-5, 12'-6, 12A-7, and 12A-8 which serve under the host station 11. The first through the eight radio base stations 12A-1 to 12A-8 cover first through eighth cells 16-1, 16-2, 16-3, 16-4, 16-5, 16-6, 16-7, and 16-8. Each of the first, the fourth, and the seventh cells 16-1, 16-4, and 16-7 has a relatively small cell diameter while each of the second, the third, the fifth, the sixth, and the eighth cells 16-2, 16-3, 16-5, 16-6, and 16-8 has a relatively large cell diameter. A private line 80 connects among the first, the second, the fourth, the fifth, the seventh, and the eighth radio base stations 12A-1, 12A-2, 12A-4, 12A-5, 12A-7, and 12A-8 each of which covers the cell adjacent to that having the different cell diameter. The first, the second, the fourth, the fifth, the seventh, and the eighth radio base stations 12A-1, 12A-2, 12A-4, 12A-5, 12A-7, and 12A-8 carry out transmission/reception on the transmission power control packets via the private line 80. But, inasmuch as the third and the sixth radio base stations 12'-3 and 12'-6 cover the third and the sixth cells 16-3 and 16-6 adjacent to those having the same cell diameter, it is unnecessary to connect the third and the sixth radio base stations 12'-3 and 12'-6 through the private line 80. This is because it is possible for the third and the sixth radio base stations 12'-3 and 12'-6 to control the upward transmission power of each terminal in accordance with the conventional transmission power control method.

In FIG. 12, a first terminal 13-1 communicates with both of the first radio base station 12A-1 covering the first cell 16-1 having the relatively small cell diameter and the second radio base station 12A-2 covering the second cell 16-2 having the relatively large cell diameter. A second terminal 13-2 communicates with both of the seventh radio base station 12A-7 covering the seventh cell 16-7 having the relatively small cell diameter and the eighth radio base station 12A-8 covering the eighth cell 16-8 having the relatively large cell diameter.

It is assumed that the first and the second terminal 13-1 and 13-2 are assigned with first and second terminal identification numbers NT1 and NT2 which are equal to one and two, respectively. It is also assumed that the first through the eight radio base stations 12A-1 to 12A-8 are assigned with first through eighth base station identification numbers NB1, NB2, NB3, NB4, NB5, NB6, NB7, and NB8 which are equal to one, two, three, four, five, six, seven, and eight, respectively.

The first terminal 13-1 transmit a first upward communication channel signal which are received in the first and the second radio base stations 12A-1 and 12A-2. The first radio base station 12A-1 covering the first cell 16-1 having the relatively small diameter sends to the private line 80 a first transmission power control packet obtained by adding the first terminal identification number and the first base station identification number to a first transmission power control signal indicative of lowering the upward transmission power of the first terminal 13-1. On the other hand, the second radio base stations 12A-2 covering the second cell 16-2 having the relatively large diameter sends to the private line 80 a second transmission power control packet obtained by adding the first terminal identification number and the second base station identification number to a second transmission power control signal indicative of raising the upward transmission power of the first terminal 13-1.

Similarly, the second terminal 13-2 transmit a second upward communication channel signal which are received in the seventh and the eighth radio base stations 12A-7 and 12A-8. The seventh radio base station 12A-7 covering the seventh cell 16-7 having the relatively small diameter sends to the private line 80 a seventh transmission power control packet obtained by adding the second terminal identification number and the seventh base station identification number to a seventh transmission power control signal indicative of lowering the upward transmission power of the second terminal 13-2. On the other hand, the eighth radio base stations 12A-8 covering the eighth cell 16-8 having the relatively large diameter sends to the private line 80 an eighth transmission power control packet obtained by adding the second terminal identification number and the eighth base station identification number to an eighth transmission power control signal indicative of raising the upward transmission power of the second terminal 13-2.

In this event, four transmission power control packets, namely, the first, the second, the seventh, and the eighth transmission power control packets flow on the private line 80.

The first radio base station 12A-1 receives the transmission power control packets each having the first terminal identification number. After reception of the first and the second transmission power control packets having the first and the second base station identification numbers, the first radio base station 12A-1 selects, as a selected transmission power control signal, the first transmission power control signal so as to lower the upward transmission power of the first terminal 13-1 to the lowest power level and transmits the selected transmission power control signal to the first terminal 13-1. Likewise, the second radio base station 12A-2 receives the transmission power control packets each having the first terminal identification number. After reception of the first and the second transmission power control packets having the first and the second base station identification numbers, the second radio base station 12A-2 selects, as a selected transmission power control signal, the first transmission power control signal so as to lower the upward transmission of the first terminal 13-1 to the lowest power level and transmits the selected transmission power control signal to the first terminal 13-1.

Similarly, communicating with the second terminal 13-2, each of the seventh and the eighth radio base stations 12A-7 and 12A-8 receives the seventh and the eighth transmission power control packets from the private line 80 and transmits a selected transmission power control signal to the second terminal 13-2. Specifically, the seventh radio base station 12A-7 receives the transmission power control packets each having the second terminal identification number. After reception of the seventh and the eighth transmission power control packets having the seventh and the eighth base station identification numbers, the seventh radio base station 12A-7 selects, as the selected transmission power control signal, the seventh transmission power control signal so as to lower the upward transmission power of the second terminal 13-2 to the lowest power level and transmits the selected transmission power control signal to the second terminal 13-2. Likewise, the eighth radio base station 12A-8 receives the transmission power control packets each having the second terminal identification number. After reception of the seventh and the eighth transmission power control packets having the seventh and the eighth base station identification numbers, the eighth radio base station 12A-8 selects, as the selected transmission power control signal, the seventh transmission power control signal so as to lower the upward transmission power of the second terminal 13-2 to the lowest power level and transmits the selected transmission power control signal to the second terminal 13-2.

As described above, in the CDMA type mobile communication system according to the second embodiment of this invention, the radio base stations in an area having the different cell diameter are connected via the private line or LAN to carry out transmission and reception on the transmission power control signals for controlling the upward transmission power of the terminals. As a result, is is possible to eliminate overhead in the host station. In addition, inasmuch as the radio base stations in the area having the different cell diameter alone are connected via the private line (LAN), it is possible to reduce transmission capacity of the private line in comparison with communication lines for connecting the host station with the radio base stations as described in the above first embodiment.

While this invention has thus far been described in conjunction with a few preferred embodiments thereof, it will now be readily possible for those skilled in the art to put this invention into practice in various other manner. For example, the number of the radio base stations is restricted to two. In addition, the mobile communication system may be applicable to not only the CDMA type but also a TDMA type or a FDMA type.

What is claimed is:

1. In a mobile communication system comprising a plurality of radio base stations covering respective service areas, at least one mobile station moving in the service areas to carry out radio communication between the mobile station and the radio base stations, and a host station connected to said radio base stations, each of said radio base stations comprising:
a receiver for receiving an upward communication channel signal from said mobile station;
a processor for calculating, on the basis of the upward communication channel signal, a transmission power control signal for controlling transmission power for said mobile station; and
a transmitter for transmitting the transmission power control signal to said host station,
said host station comprising:
a receiver for receiving the transmission power control signals from said radio base stations as received transmission power control signals;
a selection device for selecting, as a selected transmission power control signal, one of the received transmission power control signals that provides the lowest transmission power for said mobile station of any of the received transmission power control signals; and
a transmitter for transmitting the selected transmission power control signal to a particular one of the radio base stations that communicates with said mobile station,
each of said radio base stations further comprising:
a receiver for receiving the selected transmission power control signal from said host station; and
a transmitter for transmitting the selected transmission power control signal to said mobile station,
said mobile station comprising:
a receiver for receiving the selected transmission power control signal from the radio base station communicating with said mobile station; and
a controller for controlling the transmission power on the basis of the selected transmission power control signal.

2. In a mobile communication system comprising a plurality of radio base stations covering respective service areas and at least one mobile station moving in the service areas to carry out radio communication between the mobile station and the radio base stations, and a host station connected to said radio base stations, each of said radio base stations comprising:
a receiver for receiving an upward communication channel signal from said mobile station;
a processor for calculating, on the basis of the upward communication channel signal, a transmission power control signal for controlling transmission power for said mobile station;
a transmitter for transmitting the transmission power control signal to said host station;
a receiver in said host station for receiving the transmission power control signals from said radio base stations as received transmission power control signals;
a selector in said host station for selecting, as a selected transmission power control signal, one of the received transmission power control signals that provides the lowest transmission power for said mobile station of any of the received transmission power control signals; and
a transmitter in said host station for transmitting the selected transmission power control signal to said mobile station via a base station corresponding to the selected transmission power control signal,
wherein the radio base stations are connected via a private line, and transmission and reception of said power control signal occurs via said private line,
said mobile station comprising:
a receiver for receiving the selected transmission power control signal from the radio base station communicating therewith; and
a controller for controlling the transmission power therefor on the basis of the selected transmission power control signal.

3. A method of controlling transmission power for a mobile station for use in a mobile communication system comprising a plurality of radio base stations covering respective service areas and a host station connected to said radio base stations, said mobile station moving in the service areas to carry out radio communication between the mobile station and the radio base stations, said method comprising the steps of:

receiving, in a number of said radio base stations, an upward communication channel signal from said mobile station;

calculating, in said number of radio base stations, a transmission power control signal for controlling the transmission power of said mobile station on the basis of the upward communication channel signal; transmitting the transmission power control signal from said number of radio base stations to said host station, receiving, in said host station, the transmission power control signals from said number of radio base stations as received transmission power control signals;

selecting, in said host station, as a selected transmission power control signal, one of the received transmission power control signals that provides the lowest transmission power for said mobile station among the received power control signals;

transmitting, from said host station, the selected transmission power control signal to a particular one of said radio base stations that communicates with the mobile station;

receiving, in the particular one of said radio base stations, the selected transmission power control signal from said host station;

transmitting, from the particular one of said radio base stations, the selected transmission power control signal to said mobile station, receiving, in said mobile station, the selected transmission power control signal from the particular one of said radio base stations; and controlling, in said mobile station, the transmission power on the basis of the selected transmission power control signal.

4. A method of controlling transmission power for a mobile station for use in a mobile communication system comprising a plurality of radio base stations covering respective service areas and connected by a private line, said mobile station moving in the service areas to carry out radio communication between said mobile station and said radio base stations, said method comprising the steps of:

receiving, in a number of said radio base stations, an upward communication channel signal from said mobile station;

calculating, in said number of radio base stations, a transmission power control signal for controlling the transmission power for said mobile station on the basis of the upward communication channel signal;

transmitting the transmission power control signal from said number of radio base stations to said host station;

receiving, in said host station, the transmission power control signals from said number of radio base stations as received transmission power control signals;

selecting, in said host station, as a selected transmission power control signal, one of the received transmission power control signals that provides the lowest transmission power for said mobile station among the received power control signals;

transmitting the selected transmission power control signal from said host station via said radio base stations to said mobile station, receiving, in said mobile station, the selected transmission power control signal from the radio base station communicating therewith; and controlling, in said mobile station, the transmission power on the basis of the selected transmission power control signal.

5. A host station for use in a mobile communication system including a plurality of radio base stations, each of said radio base stations including, a receiver for receiving an upward communication channel signal from said mobile station; a processor for calculating, on the basis of the upward communication channel signal, a transmission power control signal for controlling transmission power for said mobile station; a transmitter for transmitting the transmission power control signal to said host station; a receiver for receiving a selected transmission power control signal from said host station; and a transmitter for transmitting the selected transmission power control signal to said mobile station, said host station comprising:

a receiver for receiving the transmission power control signals from said radio base stations as received transmission power control signals;

a selector for selecting, as the selected transmission power control signal, one of the received transmission power control signals that provides the lowest transmission power for said mobile station among the received power control signals; and a transmitter for transmitting the selected transmission power control signal to a particular one of the radio base stations that communicates with said mobile station.

6. A radio base station carrying out radio communication with a mobile station in a mobile communication system comprising a host station, said radio base station being one of a plurality of radio base stations in said mobile communication system, said radio base station comprising:

a receiver for receiving an upward communication channel signal from said mobile station;

a processor for calculating, on the basis of the upward communication channel signal, a transmission power control signal for controlling transmission power for said mobile station;

a transmitter for transmitting the transmission power control signal to said host station;

a receiver in said host station for receiving the transmission power control signals from said radio base stations as received transmission power control signals;

a selector in said host station for selecting, as a selected transmission power control signal, one of the received transmission power control signals that provides the lowest transmission power for said mobile station among the received power control signals; and a transmitter for transmitting the selected transmission power control signal to said mobile station via a base station corresponding to the selected transmission power control signal, wherein the radio base stations are connected via a private line, and transmission and reception of said power control signal occurs via said private line.

* * * * *